(12) United States Patent
Ivanov et al.

(10) Patent No.: US 10,504,314 B2
(45) Date of Patent: Dec. 10, 2019

(54) BLOCKCHAIN-BASED ANONYMIZED CRYPTOLOGIC VOTING

(71) Applicants: Accenture Global Solutions Limited, Dublin (IE); DSX Holdings Limited, St. Heiler (JE)

(72) Inventors: Aleksandr Nikolaevich Ivanov, Saint Petersburg (RU); Aleksei Vladimirovich Kazennov, Saint Petersburg (RU); Georgii Valerievich Mavchun, Saint Petersburg (RU); Mikhail Rymanov, London (GB); Peter de Rooji, London (GB); John Velissarios, London (GB)

(73) Assignees: Accenture Global Solutions Limited, Dublin (IE); DSX Holdings Limited, St. Helier (JE)

( * ) Notice: Subject to any disclaimer, the term of this patent is extended or adjusted under 35 U.S.C. 154(b) by 0 days.

(21) Appl. No.: 16/212,026

(22) Filed: Dec. 6, 2018

(65) Prior Publication Data

US 2019/0236879 A1 Aug. 1, 2019

(30) Foreign Application Priority Data

Jan. 29, 2018 (RU) .............................. 2018103253

(51) Int. Cl.
*G07C 13/00* (2006.01)
*H04L 9/32* (2006.01)
(Continued)

(52) U.S. Cl.
CPC .......... *G07C 13/00* (2013.01); *G06F 21/602* (2013.01); *H04L 9/0637* (2013.01);
(Continued)

(58) Field of Classification Search
CPC ........... G07C 13/00; H04L 9/088; H04L 9/30; H04L 9/32
See application file for complete search history.

(56) References Cited

U.S. PATENT DOCUMENTS

| 9,967,238 B1 | 5/2018 | Hogan et al. |
| 2015/0006895 A1 | 1/2015 | Irvine |

(Continued)

FOREIGN PATENT DOCUMENTS

| CN | 107146318 A | 9/2017 |
| DE | 10325491 | 12/2004 |

(Continued)

OTHER PUBLICATIONS

Torben Pryds Pedersen, Non-Interactive and Information-Theoretic Secure Verifiable Secret Sharing, In "Advances in Cryptology—CRYPTO '91: Proceedings", 1992, Springer Berlin Heidelberg, pp. 129-140, http://dx.doi.org/10.1007/3-540-46766-1_9.

(Continued)

*Primary Examiner* — Yonas A Bayou
(74) *Attorney, Agent, or Firm* — Brinks Gilson & Lione; Daniel H. Broaddus

(57) ABSTRACT

A system may facilitate distributed ledger technology (DLT) record based (for example, blockchain-based) voting. A node configured to support a voter role may access a DLT record to determine answers and/or parameters for a ballot. An organizer of the ballot may provide the voter with a voter token that confers vote-value to the voter. The voter may distribute the vote-value to the answers using committed tokens that bind the voter to a particular vote-value without divulging the particular vote value while in a cryptographic form. The voter may distribute committed tokens to multiple answers. In some cases, the distribution of the committed tokens to multiple answers may frustrate attempts to deter- (Continued)

mine the one or more targets to which the voter delivers a non-null vote-value.

20 Claims, 10 Drawing Sheets

(51) Int. Cl.
*H04L 9/30* (2006.01)
*H04L 9/08* (2006.01)
*G06F 21/60* (2013.01)
*H04L 9/06* (2006.01)

(52) U.S. Cl.
CPC ............ *H04L 9/0643* (2013.01); *H04L 9/088* (2013.01); *H04L 9/30* (2013.01); *H04L 9/3066* (2013.01); *H04L 9/32* (2013.01); *G06Q 2220/00* (2013.01); *G06Q 2230/00* (2013.01); *H04L 9/3236* (2013.01); *H04L 2209/463* (2013.01)

(56) References Cited

U.S. PATENT DOCUMENTS

| | | | |
|---|---|---|---|
| 2017/0046689 A1* | 2/2017 | Lohe | G06F 12/1408 |
| 2017/0048209 A1* | 2/2017 | Lohe | H04L 63/0442 |
| 2017/0109955 A1* | 4/2017 | Ernest | H04L 9/3257 |
| 2017/0289111 A1 | 10/2017 | Voell et al. | |
| 2017/0352219 A1* | 12/2017 | Spanos | G07C 13/00 |
| 2017/0358161 A1 | 12/2017 | Hao et al. | |
| 2018/0102013 A1* | 4/2018 | Spanos | G06F 21/64 |
| 2018/0232526 A1* | 8/2018 | Reid | H04L 9/3239 |
| 2019/0019367 A1* | 1/2019 | Unagami | G07C 13/00 |
| 2019/0051079 A1 | 2/2019 | Venkataraman et al. | |
| 2019/0058592 A1* | 2/2019 | Wright | G06N 7/00 |
| 2019/0088062 A1* | 3/2019 | Unagami | H04L 9/3247 |

FOREIGN PATENT DOCUMENTS

| | | | | |
|---|---|---|---|---|
| EP | 0908810 | A2 | 4/1999 | |
| EP | 3457623 | A1 * | 3/2019 | |
| RU | 2242793 | | 8/2004 | |
| RU | 2298229 | | 6/2006 | |
| RU | 2444063 | | 2/2012 | |
| WO | WO 2010/073065 | | 7/2010 | |
| WO | WO-2016015041 | A1 * | 1/2016 | ........... H04L 9/3297 |
| WO | WO-2017011601 | A1 * | 1/2017 | ......... G06Q 30/0601 |
| WO | WO-2017145005 | A1 * | 8/2017 | .............. G06N 7/00 |
| WO | WO 2005/093671 | A2 | 10/2017 | |

OTHER PUBLICATIONS

Maxwell, G., Confidential Transactions, 2015, https://people.xiph.org/greg/confidential_values.txt, retrieved from the internet on Feb. 26, 2019.
Maxwell, G. and Poelstra, A., Borromean Ring Signatures, 2015, https://github.com/Blockstream/borromean_paper/raw/master/borromean_draft_0.01_9ade1e49.pdf, retrieved from the internet on Feb. 26, 2019.
Tim Ruffing and Pedro Moreno-Sanchez, Mixing Confidential Transactions: Comprehensive Transaction Privacy for Bitcoin, 2017, https://eprint.iacr.org/2017/238.pdf.
Non-Final Rejection dated Feb. 25, 2019, U.S. Appl. No. 16/212,228.
Ex Parte Qualye Action dated Feb. 28, 2019, U.S. Appl. No. 16/212,187.
Extended European Search Report for European Patent Application No. 19153832.1 dated Jun. 24, 2019.
Extended European Search Report for European Patent Application No. 19153827.1 dated Jul. 1, 2019.
Extended European Search Report for European Patent Application No. 19153833.9 dated Jul. 1, 2019.
International Search Report for PCT Patent Application No. PCT/EP2019/051905 dated Apr. 18, 2019.
Notice of Allowance for U.S. Appl. No. 16/212,187 dated Apr. 19, 2019.

* cited by examiner

10,504,314 B2

BLOCKCHAIN-BASED ANONYMIZED CRYPTOLOGIC VOTING

CROSS-REFERENCE TO RELATED APPLICATIONS

This application is related to U.S. patent application Ser. No. 16/212,187, filed herewith on Dec. 6, 2018, titled Blockchain-based Cryptologic Ballot Organization, which is incorporated by reference in its entirety. This application is related to U.S. patent application Ser. No. 16/212,228, filed herewith on Dec. 6, 2018, titled Blockchain-based Cryptologic Ballot Verification, which is incorporated by reference in its entirety.

PRIORITY CLAIM

This application claims priority to Russian Patent Application Serial No. 2018103253, filed 29 Jan. 2018, and titled Electronic Voting and Verification in an e-Ballot Voting System.

TECHNICAL FIELD

This disclosure relates to blockchain-based cryptologic voting.

BACKGROUND

Rapid advances in electronics and communication technologies, driven by immense customer demand, have resulted in newly emerging complex verifiable ledger systems. Improvements in the hardware and software implementations of the underlying processing for the verifiable ledger systems will increase the security, reliability, and speed of the implementations.

DETAILED DESCRIPTION

Figure 1:
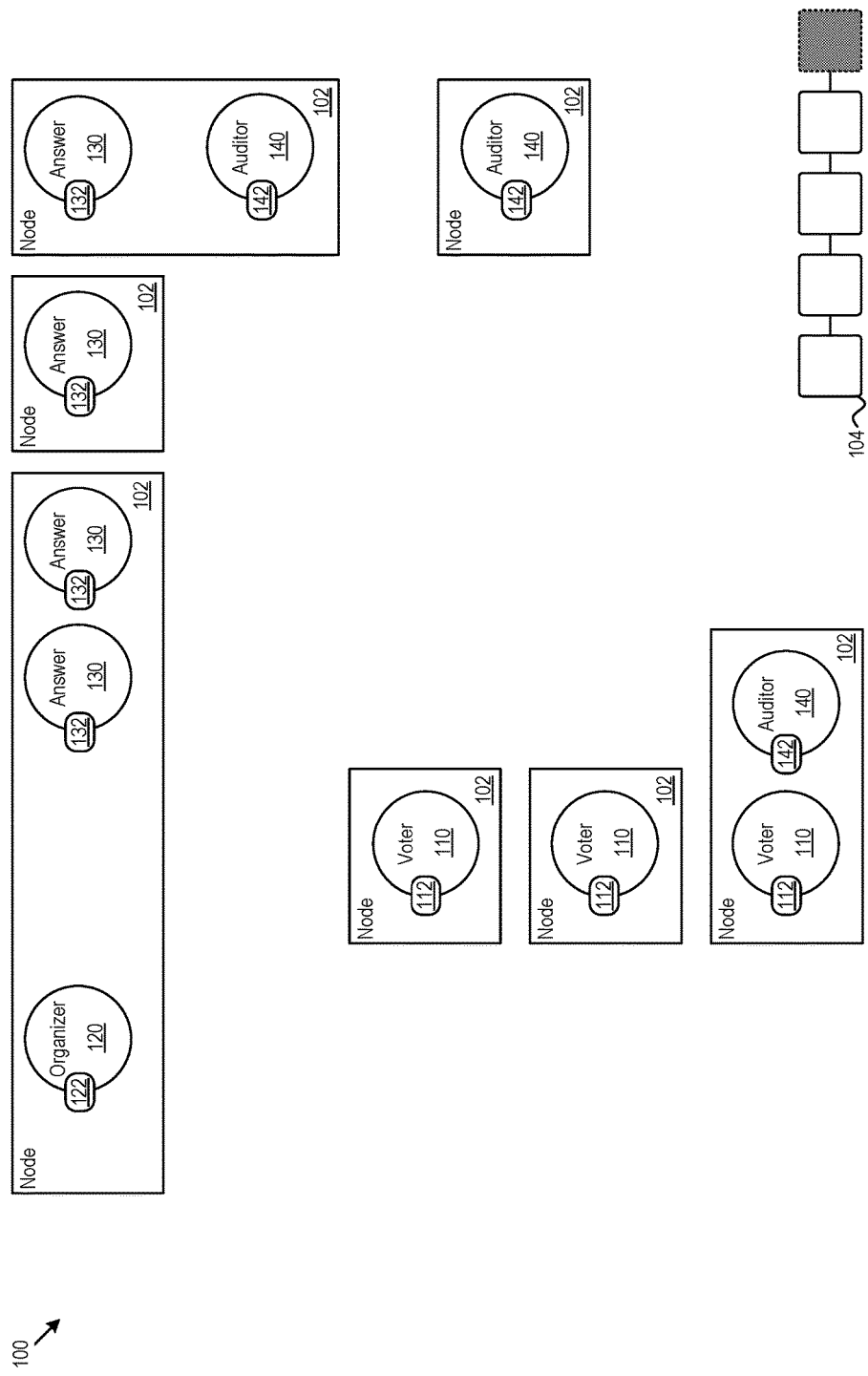
FIG. 1 shows an example balloting environment.

Distributed ledger technologies (DLTs), backed by blockchain and other cryptographic structures provide a platform by which transactions may be recorded with protection from post-recording tampering. In balloting systems, including private organization voting (e.g., shareholder voting, member voting, employee voting or other private organization elections), municipal/state/federal elections, legislative voting, surveying, polling, or other question-answer systems DLTs allow for a verifiable record (e.g., a virtual paper trail) including where elections are performed remotely (e.g., over a telecommunications network). Further, digital signatures and other digital identity techniques allow for secure identification of voters, ballot organizers, and/or auditors.

In some cases, implementation on a DLT may allow for non-secret balloting. In some balloting systems, non-secret voting (e.g., submission of an answer in a balloting system) may be practical. For example, in legislative voting or judicial responses the identity of individual voters may be a part of the public record.

In some cases, secret balloting may be implemented on a verifiable DLT record. The techniques and architectures discussed below provide a verifiable DLT record while maintaining anonymity of voters (e.g., via pseudonymity or other obfuscation). The techniques and architectures increase the privacy of verifiable DLT balloting using tokens (e.g., committed tokens, range-proof tokens, voter tokens, organizer tokens, result tokens, validity tokens, or other tokens), identifiers, and/or other cryptographic primitives to hide real voter identities and obscure the content of individual votes. The techniques and architectures increase the security of secret balloting by providing a distributed ledger (e.g., backed by a cryptographic structure) that may be audited by nodes under the control voters, organizers, and/or third parties. Thus, balloting done in accord with the techniques and architectures may be later verified for accuracy and validity by stakeholders. Invalid or tampered results may be rejected. In some cases, auditors may record their certifications of the vote to the DLT record further increasing the security and confidence in the balloting system. The techniques and architectures increase the efficiency and flexibility of secret balloting by using one or more of the aforementioned cryptographic primitives and/or cryptographic structures which may operate in localized or networked computer environments. Accordingly, environments implementing example implementations provide for increased efficiency by preserving secrecy of ballots and secure identity without necessarily requiring physical travel or gathering of the parties involved in the balloting. In sum, the discussed techniques and architectures (including tokens, identifiers, distributed ledger, and cryptographic structures) provide technical solutions to the technical problems of increasing the privacy, security, efficiency, and flexibility of balloting systems. Accordingly, the discussed techniques and architectures provide improvements over existing market solutions.

Figure 2:
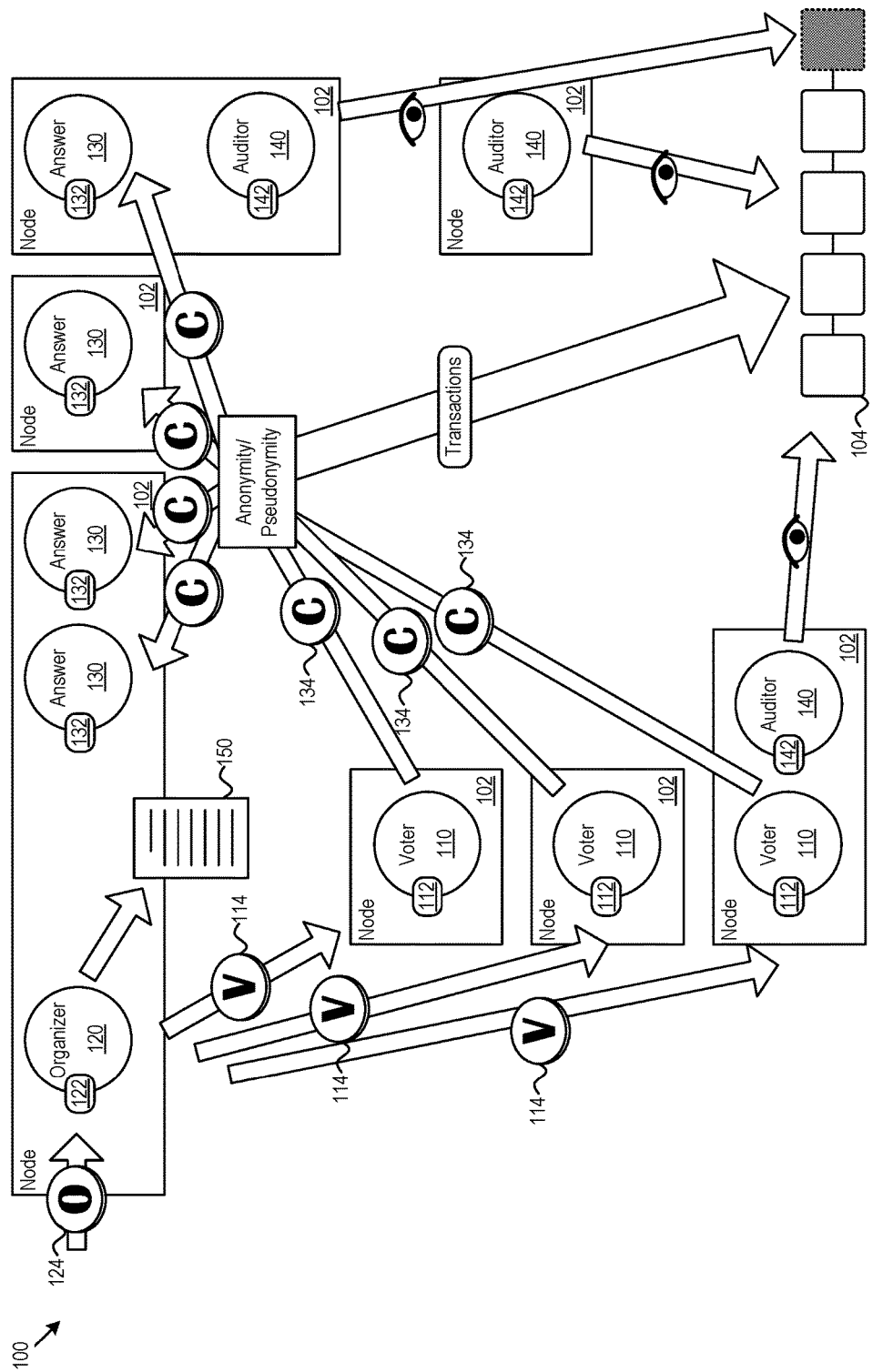
FIG. 2 shows the example balloting environment of FIG. 1 with indications of the flow of interaction within the environment.

FIG. 1 shows an example balloting environment 100. In the example environment 100 nodes 102 store (e.g., in whole or in part) a DLT record 104, such as distributed ledger stored as a blockchain or other cryptographic structure, in memory. The nodes 102 may form a distributed network by redundantly storing the DLT record 104 and achieving consensus regarding transactions and updates posted to the DLT record. Various sequencing consensus mechanisms and/or DLT architectures may be used (e.g., Bitcoin, Ethereum, or other DLT environments). In some cases, a node may hold information on a state of the DLT record relevant to the node's transactions, the node may not necessarily store portions of the DLT record beyond the relevant information FIG. 2 shows the example balloting environment 100 along with indications of the flow of tokens, data, and interactions within the example balloting environment 100. The flow of tokens is shown among the nodes. However, in various implementations, the flow of tokens may be implemented through transaction recorded on the DLT record.

Accordingly, a node may not necessarily pass a physical token or data representation to another node, but may record a passage of control/ownership of the token to a DLT record. A cryptographic structure may include data groupings, such as blocks, that are linked to others of the data groupings via cryptographic primitives, such as hashes. For example, in a blockchain, a series of blocks may be linked and protected from data tamper by the blocks in the series that include hashes to the previous blocks in the series. Cryptographic primitives may include hashes, commitments, certificates, signatures, keys, identifiers, ciphers, state inputs, or other cryptographic entities that may provide secure identity, data integrity, data obfuscation, or other security features.

The nodes 102 may transact on the DLT record 104 on the behalf of one or more roles (e.g., voters 110, organizers 120, answers 130, auditors 140, and/or other roles). The nodes 102 may adopt one or more roles via identifiers (e.g., voter identifiers 112, organizer identifiers 122, answer identifiers 132, auditor identifiers 142, and other identifiers). In some cases, a role may be adopted by a node without any particular identifier, for example a node may, in some cases, assume an auditor role without pre-designated identifier. In some cases, a node acting in an auditor capacity may provide an identifier to distinguish from other auditor nodes or other participating nodes. The identifiers may include public keys (e.g., for use in asymmetric encryption algorithms) associated with individual members of the various roles.

A node 102 may act within a role, e.g., as a voter 110, organizer 120, answer 130, auditor 140, or other role, based on virtually any authority system for assigning roles or authentication of logon credentials. For example, an organizer may self-assign the organizer role and then designate voters and answers. In the example, auditors may include volunteer participants and may self-assign. Other configurations may be used. A node may access private keys for a role (e.g., paired to public keys for the role) upon grant of access based on role assignment/logon.

The organizer 120 may establish a ballot 150, e.g., a set of answers 130 with answer identifiers 132, an organizer token 124 holding the vote-value for the ballot 150. In various implementations discussed throughout the disclosure, a ballot, e.g., through its digital structure, may include a set of allowed answers for a vote and define rules for a valid vote. The organizer may designate voters 110. The organizer may distribute the established vote-value in the organizer token 124 to the voters via voter tokens 114. In various implementations throughout the disclosure, a voter token may include a data structure that uses cryptographic primitives to transfer vote value to a voter. The voter token may be recorded within a voter transaction.

The voters 110 may receive the voter tokens 114. The voters 110 may distribute the vote-value in the voter tokens to the answers 130. In some cases, the vote-value in voter tokens may be binary (e.g., yes/no), integer (e.g., n votes), or fractional (e.g., votes may be split accord with decimal values). In some cases, vote-value transfers may be confined to a specific range. For example, the organizer 120 may configure a ballot 150 such that negative vote-values are disallowed to prevent a voter from conferring useless negative vote-value to one answer thereby increasing the vote-value that voter may confer to another answer.

Voters may send vote-value to answers using committed tokens 134. In various implementations throughout the disclosure, committed tokens may contain a cryptographic commitment to the vote-value conferred in the committed token. The commitment does not reveal the vote-value. However, any later revealed vote-value may be compared against the commitment. For example, the commitment algorithm may be applied to the revealed vote-value to recreate the commitment in the committed token. If the recreated committed value does not match, the committed value in the committed token the reveal vote-value can be identified as invalid.

To obfuscate which answers the voter confer vote-value, the voters may also confer null vote-value (e.g., zero or otherwise valueless vote-value) to answers. For example, a voter 110 may outwardly appear to send a token to every answer. However, some portion of the tokens sent may be null tokens. This may frustrate attempts to determine a particular voter's answer selections by monitoring which answers 130 received tokens from the voter.

In some implementations, homomorphic commitments may be used within the committed tokens. Homomorphic commitments have the property that the sum of the commitment is equal to the commitment of the sum. Homomorphic commitments may support aggregate vote-value verification. For example, an auditor 140 may check that the sum of the tokens received by the answers 130 is equal to the sum of tokens sent by the voters 110. This check by the auditor 140 may be done without reliance on knowledge of the individual votes of the voters 110.

The token transfers (e.g., from the organizers 120 to the voters 110 and from the voters 110 to the answers may be recorded on the DLT record 104 to preserve the integrity of the transactions for later verification and to create an immutable (e.g., functionally immutable) virtual paper trail. For example, without cooperation from at least a large minority (e.g., one third, one half, or other portion depending on the consensus procedure used with the DLT) of participating nodes, the DLT record cannot be changed without creating inconsistences with data-integrity cryptographic primitives (e.g., hashes, checksums, or other data integrity protecting primitives). Further, without universal cooperation, evidence of a DLT fork may be maintained by nodes. Thus, attempts to surreptitiously change voting results stored on a DLT record may be frustrated by the constraints against any one node making changes to a DLT record.

Nodes 102 may perform multiple roles simultaneously. For example, two separate identities (e.g., a vote and an organizer) may be served by a single node. Further, particular identities may serve multiple roles. For example, an organizer may be a voter and/or answer. Auditors may also be voters, organizers, or answers. Other combinations are possible.

Additionally or alternatively, roles may be executed by non-participant nodes. For example, a particular node may not necessarily have write privileges for the ballot system DLT record (e.g., a non-participant node). However, the particular node may represent one or more roles. The particular node may execute the tasks of the roles by requesting DLT recordation from participant nodes. Therefore, a user performing a role may not necessarily need to log on to a node that is a participant in the DLT itself. In an example scenario, a user performing a voter role may log on to a remote terminal and execute votes by sending messages requesting DLT transactions rather than appending the DLT transactions directly by the remote terminal.

Figure 3:
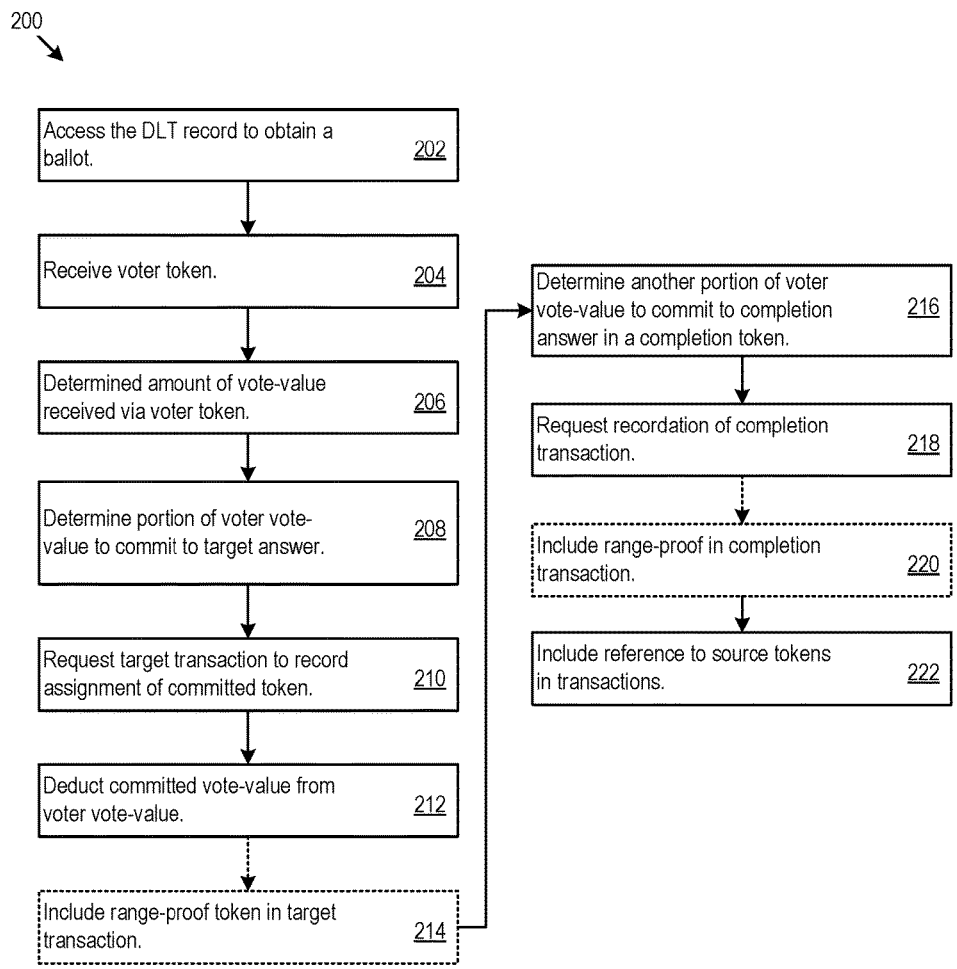
FIG. 3 shows example anonymized cryptologic voting logic.

Below, in reference to FIGS. 3, 4, and 5 example logic to support the operation of voters 110, organizers 120, and auditors 140 is discussed. Referring now to FIG. 3, which shows example anonymized cryptologic voting logic (ACVL 200). The ACVL 200 may be implemented on circuitry, e.g., cryptologic voting circuitry. The ACVL 200 may access the DLT record 104 to obtain a ballot for which the voter 110 intends to cast a vote (202). The ballot may designate answers 130 by providing answer identifiers 132 for the answers. The answer identifiers may include public keys assigned to the answers 130. The public keys may allow voters to address a committed token 134 to an answer by encrypting the committed token (or portions thereof) with the public key of the answer.

The ACVL 200 may also receive a voter token on behalf of the voter (204). The voter token may be sent by the organizer 120 and addressed to the voter identifier of the voter. Similarly, a public key of the voter may serve as the voter identifier. The ACVL 200 may determine an amount of vote-value conferred to the voter through the voter token (206). Vote-value is the voting power assigned to the voters to implement the ballot. The voters 110 receive vote-value through tokens from the organizer 120. The voters may then assign the received vote-value to one or more answers. The vote-value received by the answers may be totaled to determine the winning answers in accord with conditions for victory setup by the ballot. For example, conditions may include receiving more vote-value (e.g., a plurality of the vote value) than other answers, receiving a majority of the vote-value, exceeding a defined vote value threshold, or other conditions. Further, multiple conditions may be combined.

In response to voter input, the ACVL 200 may determine a portion of the received vote-value to commit to a target answer (208). For example, in a binary vote-value system, the ACVL 200 may commit the entire vote value to the target answer. In an integer system, a discrete sum (which may be less than the entirety) may be committed by the ACVL 200. Once a commitment has be determined, the ACVL 200 may generate a committed token that binds the voter 110 to the determined vote-value commitment. The committed token 134 may implement a cryptographic commitment to bind the voter. As one illustrative example, the committed token 134 may contain a hash of the committed vote-value. In various implementations throughout the disclosure, committed vote-value may include a determined amount of vote-value that is intended to be transferred in a transaction. The vote-value becomes "committed" when the transferring party generates a cryptographic commitment that designates the amount. The cryptographic commitment prevents the transferring party from being able to later claim a different amount was designated for transfer. Accordingly, any party asserting that the vote-value committed by the ACVL 200 is a particular amount can be checked by hashing their asserted amount. If the hashed output does not match the hash in the committed token, the asserted amount is inaccurate. However, other cryptographic primitives may be used to form commitments.

In some implementations, a commitment from the class of homomorphic commitments may be used in place of the hash described above. A homomorphic commitment is a commitment that has the additional property that the sum of two commitments is the commitment of the sum, e.g., Commit(a)+Commit(b)=Commit(a+b).

Examples of such distributions are: a voter distributes its ballots over the answers, or an intermediary distributes its ballots over the voters it represents One example homomorphic commitment (C) may include:

$$C = aA + bB \quad (\text{Eq.1})$$

where, A is a first point on an elliptic curve (e.g., an amount point) and B is a second point on the elliptic curve (e.g., a blinding point). aA is the amount term and bB is the blinding term. The factor a is the vote-value. The factor b is a blinding factor that obfuscates the vote-value a. In some cases, b may be chosen through random selection (e.g., pseudorandom, random, or other non-deterministic selection). In some implementations, the allowed range for b may be large to frustrate attempts to determine committed tokens by determining that larger values C may be more likely to have non-zero vote-value. For example, the range of b may be on the order of the elliptic field size of the curve generated by the function G (see below). B may be determined based on A. In some cases, the B may be related to A via a hash function to frustrate attempts to predict B for all A. For example, B may be determined using:

$$B = P(H(A)) \quad (\text{Eq.2})$$

where H is a hash function and P is a function that converts the hash outputs of H to points on the elliptic curve. An example hash function may include the SHA256 algorithm. However, other hash functions may be used.

A may be determined using the generation function of the elliptic curve and a shared key k. Accordingly, A may be determined by computing:

$$A = G(k) \quad (\text{Eq.3})$$

The organizer, or ballot organization logic (BOL) 300 on behalf of the organizer, may determine the generation function G and the shared key k. The organizer 120 may establish A and B by providing k and G and allowing participants (e.g., voters 110, answers 130, auditors 140) to compute A and B. The BOL 300 may also designate the hash function H and the function P.

An example committed token using the above commitment C may include:

$$[CT] = (C, E_i(a), E_i(b)) \quad (\text{Eq.4})$$

where, [CT] is the committed token structure and $E_i$ designates encryption based on the identifier (e.g., a public key) of the recipient of the vote-value. Accordingly, while the second and third fields of the example committed token are in an encrypted form (e.g., a cryptographic form), the committed token publicly binds the voter (or other conferrer of vote-value) to the committed vote value a without disclosing a until $E_i(a)$ is decrypted.

In some cases, to further obfuscate a, a random "salt," s, may be added to a before application to C.

The summation property of homomorphic commitments discussed above may be used by the AVCL in subsequent transfers of vote-value. Once a recipient has received a token, including a commitment on its value a by the sender of the token, and an encrypted vote-value (e.g., the value a), the recipient may distribute this token to two or more further recipients. The homomorphic property may be used by the sender to create the commitments to these new recipients' tokens. For example, for a distribution into two parts a1 and a2 (where the values a1 and a2 sum up to the value a originally received: a1+a2=a) the commitments to a1 and a2 sum up to the commitment of a: C(a1)+C(a2)=C(a1+a2)=C(a). Thus, the AVCL may generate a verification sum using the homomorphic property and verify that the sum (e.g., verification sum) of transferred vote value matches the vote value in the source token(s). In various implementations throughout the disclosure, a verification sum may include a sum (or information related to the sum) of the vote-value in one or more tokens used to confirm that a valid amount of vote-value was transferred within the summed tokens.

Once the ACVL 200 generates the committed token, the ACVL 200 may request a target transaction to record the assignment of the committed token to the target answer (210). To establish the authenticity of the target transaction, the ACVL 200 may use a cryptographic key associated with the voter identifier of the voter. For example, the voter identifier may include a public key and the cryptographic key may include a private key paired to the public key. The ACVL 200 may establish the authenticity of the target transaction by digitally signing the committed token using the private key.

The ACVL 200 may account for the target transaction by deducting the committed vote value from the voter vote-value received from the voter token (212).

The balloting system, including the ACVL 200, the BOL 300, and the ballot audit logic (BAL) 400, may operate in a variety of different DLT environments. For example, the balloting system may be applied in systems using an unspent outputs transaction model, an account transaction model, or other transaction model. In an example system having an unspent outputs transaction model, the ACVL 200 may generate a rest token (e.g., with the same structure as the committed token) that confers the remainder vote-value, e.g., the voter vote-value with the committed vote-value deducted, back to the voter 110. The rest token may be included in the target transaction. In some cases, where the committed token transfers all remaining vote-value, the rest token may include a token holding a null vote-value. In an example system in an account transaction model, the committed vote-value may be deducted from an account storing the voter vote-value for the voter.

In various implementations, any of the vote-value conferring tokens (e.g., organizer tokens, voter tokens, rest tokens, or other vote-value transferring tokens) may use the structure (e.g., the structure in Equation 4 above or other token structure) and cryptographic primitives used in the committed token discussed above.

The ACVL 200 may include a range-proof token along in the target transaction along with the committed token (214). The range-proof token may be used, e.g., by a node acting in an auditor role, to 0 establish that the committed value transferred by the committed token falls within a designate range. In some cases, an organizer may designate allowed ranges for vote-value transfers. For example, negative numbers may be disallowed and/or numbers above/below a designated threshold vote-value may be disallowed. The range-proof token may establish that the committed vote-value falls within the range without necessarily publically disclosing the committed vote-value. Information may be considered to be publically disclosed when made accessible without access to one or more secret (e.g., private) cryptographic keys.

Various range proofs may be implemented within the range-proof token. For example, the example range-proof discussed in Russian Patent Application Serial No. 2018103253, filed 29 Jan. 2018, and titled Electronic Voting and Verification in an e-Ballot Voting System, previously incorporated by reference herein may be used. Therein, an example range proof based on Borromean signatures with $(t+1)\log_2(M)$ rings with two keys (L, L') per ring is described. The range proof may establish that the committed value is within the allowed range, e.g., [0, M]. The signatures are also discussed in Maxwell, G. and Poelstra A., Borromean Ring Signatures, 2015, accessible at: https://qithub.com/-Blockstream/borromean paper/raw/master/borromean_draft_0.01_9ade1e49.pdf A range-proof token including a range proof for a committed value may be included within the same transaction that conveys the committed token. Additionally or alternatively, the range-proof token may be included in a different transaction. In some cases, multiple range proofs may be generated for a single committed token. For example, a first range-proof token may establish that the committed value is within [N, M] and then a second range-proof token may establish that the committed value is within [X, Y] where N, M and X, Y establish different ranges.

To establish the authenticity of the range-proof token, the ACVL may sign the range-proof token use the cryptographic key associated with the voter identifier.

The ACVL 200 may determine another portion of the voter vote-value to commit to a completion answer (216). The ACVL 200 may send tokens to multiple answers to obfuscate which answers the voter 110 selects. In an example scenario, the ACVL 200 may send a committed token to each of the answers (some of which may be null, e.g., a committed token containing a zero-value vote-value) to frustrate attempts to determine the voter's voting pattern by monitoring which answers receive tokens. The ACVL 200 may generate completion committed tokens (e.g., committed tokens generated to complete determined distribution to the answers and/or ensure that multiple answers receive committed tokens from a voter) to ensure that multiple answers receive committed tokens from the voter. In some cases, multiple committed tokens may be transferred in a single transaction. In various implementations throughout the disclosure, designations such as "target" or "completion" may be used for naming convenience to establish a contextual order, but may not necessarily designate a technical distinction. For example, a "target" committed token may be a committed token sent within the course of a vote a "completion" committed token may designated a final or later token sent within the course of a vote. Accordingly, technical features applying to "target" designations may apply equally to "completion" designations.

The ACVL 200 may sign the token and request recordation of a transaction for the completion token (218). The ACVL 200 may include range-proof tokens corresponding to the completion tokens (220). In some cases, such as the example range proof described in Russian Patent Application Serial No. 2018103253, filed 29 Jan. 2018, and titled Electronic Voting and Verification in an e-Ballot Voting System, previously incorporated by reference herein, a single range-proof token may provide range-proofs for multiple tokens.

In some cases, where a homomorphic commitment is implemented, the ACVL 200 may provide a summation token which may allow verification based on the property that the sum of the homomorphic commitments is equal to the commitment of the sum.

In various implementations, the ACVL 200 may include a reference to a source token (e.g., the origin of the vote-value to be distributed in the transaction, for example, a voter token 114, rest token, or other token) and the summation token within transactions (222). The summation token in concert with the transferred committed tokens may be analyzed in reference to the source token. Through the analysis, the total vote value in the source token may be compared to the total vote-value transferred by the multiple committed tokens and/or rest tokens in the transaction. If the vote value in the source token matches the transferred vote value, the transaction may be valid. Because the transaction may include rest tokens, a voter 110 (or other role) transferring vote value need not necessarily transfer (e.g., to others) the entire vote-value in the source token to have the vote-value in tokens in the transaction equal to the vote-value in the source token. In other words, the voter 110 may retain vote-value through rest tokens.

In some cases, the summation token may be combined in function with other tokens. For example, summation information may be extracted from the example range proof described in Russian Patent Application Serial No. 2018103253, filed 29 January 2018, and titled Electronic Voting and Verification in an e-Ballot Voting System, previously incorporated by reference herein. Accordingly, range-proof tokens using the example range proof may serve as summation tokens. To verify the committed tokens, the ACVL 200 (or other logic, BOL 300, BAL 400) may sum over the keys L from the example range-proof token. In the example, the sum of the keys L may be equal to the source token when the vote-value transferred by the tokens in the transaction is equal to the vote-value in the source token. The consistency of the keys L with the tokens in the transaction may be verified by executing the range proofs on the tokens. In various implementations throughout the disclosure, summation information may include information that may support the determination of a sum of vote-value for the generation of a verification sum.

In an example transaction, the ACVL 200 may transfer multiple committed tokens (e.g., n committed tokens) with reference to a source token and a range proof. An example structure may include:

$$[\text{Transact}]=[[\text{ST}], P[L_1, L'_1; \quad . \quad . \quad . \quad ; L_n, L'_n], [\text{CT}]_1, \ldots, [\text{CT}]_n, [\text{RT}]] \quad (5)$$

where [ST] is the source token, P is the range-proof token including the keys L and L' for the n committed tokens, and [RT] is a rest token. The verification of the transaction may further include verifying the source token was assigned to the identifier of the requester of the transaction.

Figure 4:
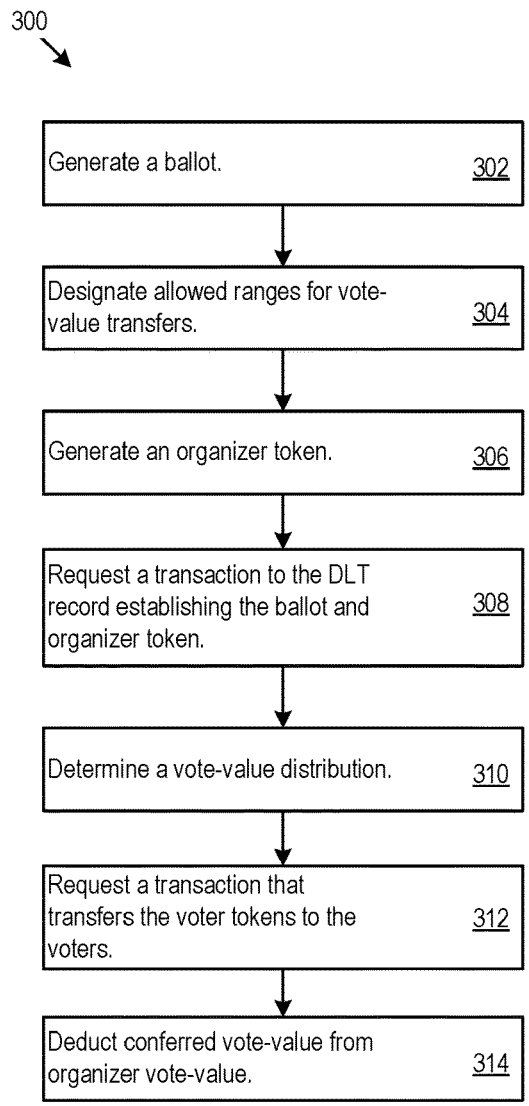
FIG. 4 shows example ballot organization logic.

Referring now to FIG. 4, example BOL 300 is shown. In various implementations, the BOL 300 may be used to setup ballots on behalf of the organizer role. The BOL 300 may be implemented on circuitry, e.g., ballot organization circuitry. The example BOL 300 may generate a ballot with answers (302). The answers may have corresponding answer identifiers. For example, the ballot may designate individual public keys for the answers.

Voters (e.g., via the ACVL 200) may use the answer identifiers to direct committed tokens assigning vote-value to the answers in accord with their voting preferences and obfuscation scheme.

The BOL 300 may designate an allowed range for vote-value transfers for the ballot 150 (304).

To setup an initial supply of vote-values to distribute to voters, the BOL 300 may generate an organizer token (306). In various implementations throughout the disclosure, an organizer token may include a cryptographic data structure that may be generated to transfer (or initiate transfer through third-party intermediaries) an initial distribution of vote-value to voters.

The BOL 300 may establish the ballot by requesting a transaction recording the ballot 150 to the DLT record (308). Additionally or alternatively, the transaction may establish the organizer token.

In an example, the transaction establishing the ballot (e.g., with n answers) may have the structure:

$$[\text{Transact}]=[[\text{OT}]', \text{Bal}[\text{AI}_1, \ldots, \text{AI}_n, \{\text{Range}\}, \{T\text{Type}\}, k, G, H]] \quad (6)$$

where [OT]' signifies a non-transfer establishment the organizer token, Bal is the ballot, AI are the answer identifiers, {Range} is a field designating the allowed range for vote-value transfers, {TType} is a field designating allowed token types (e.g., binary, integer, decimal, or other vote types), k is the key for generation of the amount point, G is the generation function for the elliptic curve, and H is the hash function for generation of the blinding point from the amount point. In some cases, the BOL 300 may digitally sign the ballot, for example, using a private key associated with a public key established by the BOL 300 as the organizer identifier.

In some cases, the ballot may further designate voter identifiers for allowed voters for the ballot.

In some cases, the BOL 300 may designate voters through the transfer of vote-value via voter tokens. In other words, the reception of vote-value at a particular identifier entitles a vote. In some implementations, the system may disallow answers from retransferring (e.g., as second-round voters) vote-value received from voters in committed tokens. In other words, committed tokens would not be valid source tokens. For example, vote-value in organizer tokens, voter tokens, and rest tokens may be retransferred after receipt, but vote-value in committed token may be disallowed for retransfer. Further, the organizer may use one or more intermediaries to distribute vote-value to the voters. For example, the organizer may transfer vote-value to an intermediary which may transfer that vote-value (or a portion thereof) to a voter. Multiple layers of intermediaries may be used. In some implementations, any token, including committed tokens, containing vote-value may act as a source token. Received vote-value may be passed among the voters and answers until the election ends.

In various implementations, the election may be ended in response to an event (e.g., a vote-value threshold achieved by an answer, a request from an organizer or other role, a final voter casting a vote, or other event) or at a designated time. The BOL 300 may establish conditions for ending the vote within the ballot.

The BOL 300 may determine a vote-value distribution (310). In various implementations throughout the disclosure, the vote-value distribution may detail the quantity of vote-value that may be transferred the individual voters.

The BOL 300 may distribute the vote-value, e.g., in accord with the vote-value distributions, to voters by requesting a transaction transferring voter tokens to the voters (312). The vote-value conferred to the voters (e.g., conferred vote-value) may be deducted from the organizer vote-value established by the organizer token (314). The transaction may further transfer a rest token back to the organizer, which may allow the organizer to advance to a voter role or continue to distribute vote-value to voters with the remaining vote-value in the rest token.

In an example, the transaction transferring the voter tokens (e.g., n voter tokens) may have the structure:

$$[\text{Transact}]=[[\text{OT}],[\text{VT}]_1, \ldots, [\text{VT}]_n, [\text{RT}]] \quad (7)$$

where [OT] is the organizer token (e.g., the source token), [VT] are the voter tokens, and [RT] is a rest token. Although not shown, the transaction may further include a summation token and/or range-proof tokens to support verification.

Figure 5:
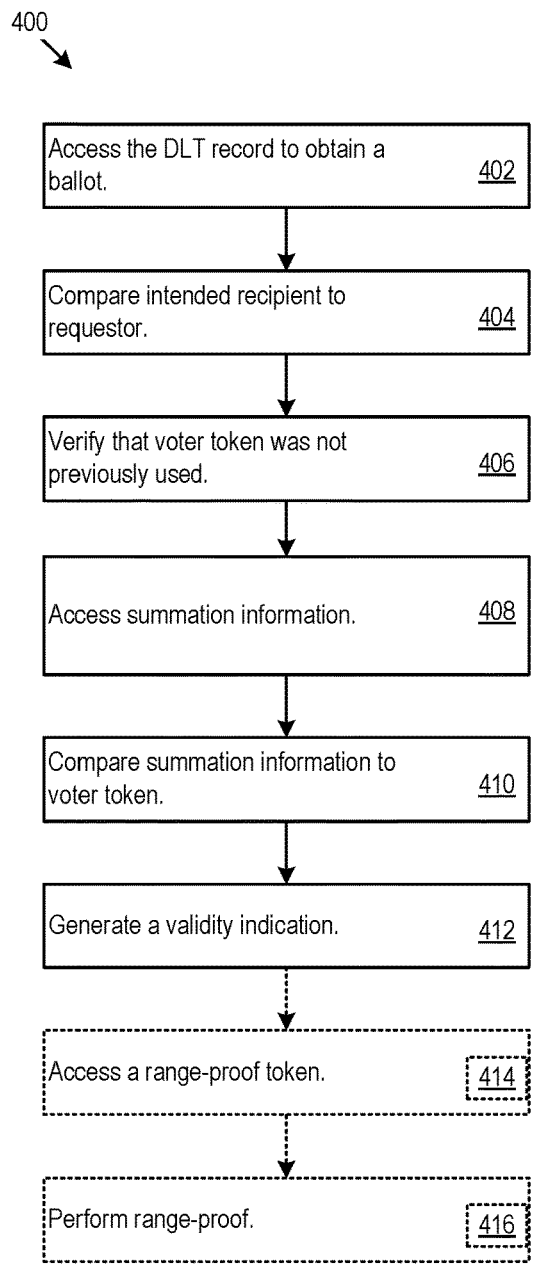
FIG. 5 shows example ballot auditing logic.

Referring now to FIG. 5, example BAL 400 is shown. In various implementations, the BAL 400 may be used to audit transactions related to ballots on behalf of the auditor role. The BAL 400 may be implemented on circuitry, e.g., ballot auditing circuitry. The BAL 400, e.g., through its operation, may increase the security and accuracy of a balloting system via technical solutions. The BAL 400 may verify transactions for accuracy and integrity using analysis and, in some cases, recordation of cryptographic primitives and structures.

Referring now to the operation of the BAL 400, the BAL may access a ballot recorded on one or more DLT records. For example, the BAL 400 may access a ballot previously setup by the BOL 300 on behalf of an organizer (402). The BAL 400 may access a voter transaction for verification. In various implementations throughout the disclosure, a voter transaction may include a DLT record of the transfer of vote value from The voter transaction may include one or more committed tokens and/or other tokens, such as range-proof tokens, rest tokens and/or summation tokens. The voter transaction may reference a voter token and/or a rest token that may serve as the source token for the voter transaction. The BAL 400 may access the voter token, e.g., from an organizer transaction that originally conferred the voter token. The verification may be applied to virtually any transaction recorded on the DLT. Accordingly, the BAL 400 may verify individual transactions and/or entire voting processes.

The BAL 400 may compare the intended recipient of the voter token to the identifier of the voter that requested the voter transaction (404). Through the comparison, the BAL 400 may confirm that the source of the vote-value underlying the voter transaction was owned by the voter that requested the voter transaction. In some cases, this may frustrate attempts to secretly cast votes using vote-value owned by another voter (or other entity).

Additionally or alternatively, the BAL 400 may access the DLT record to verify that the voter token has not been previously used in another voter transaction (406). In other words, the BAL 400 may verify that the voter token is not "double spent."

The BAL 400 may access summation information for the committed tokens within the voter transaction (408). For example, the BAL 400 may access a summation token (or other token usable as a summation token, such as, as a range-proof token based on the example range-proof discussed above).

The BAL 400 may compare the summation information to the voter token (or other source token) (410). The BAL 400 may use the comparison to determine whether the vote-value transferred (e.g., via committed tokens and/or rest tokens) in the voter transaction matches the voter vote-value in the voter token. The BAL 400 may also verify other transaction types (e.g., organizer transactions) using the above discussed logic.

Responsive to the determining whether a match is present, the BAL 400 may generate a validity indication for the voter transaction (412). In various implementations throughout the disclosure, the validity indication may confirm valid voter transactions and/or mark invalid transactions. In some cases, generating a validity indication, which may, for example, include a cryptographic primitive such as a digital signature signing a data indication that a particular vote (or individual voter transaction within a vote) is valid, may be accompanied by sending the validity indication to the voter that requested the voter transaction and/or the organizer. In some cases, the BAL 400 may send the validity indication to a selection of and/or all participants (e.g., a broadcast or multicast) in the vote.

In various implementations, the validity indication may be recorded to the DLT record as a validity token. The validity token may include a reference to the voter transaction and the validity indication. In some cases, the validity token may be digitally signed by the BAL 400 on behalf of the auditor. The more distinct auditors that agree on a sign voter tokens indicating validity/non-validity of a voter transaction—the more likely that the conclusion of the auditors is correct and reliable.

In some implementations, that voter may have an opportunity to correct an invalid transaction responsive to an indication of non-validity. For example, corrections may be allowed before the election is ended. The ACVL 200 may request a new transaction that references the old transaction. The new transaction may redistribute the voter token (or other source token) in a different manner to attempt to achieve validity.

In various implementations, invalid transactions may be ignored. For example, participants may treat operate as if the transaction did not occur. In some cases, transactions dependent on an invalid transaction may also be ignored.

In some implementations, one or more invalid transactions may invalidate an entire election. For example, an organizer may invalidly distribute an organizer token into voter tokens. The voter tokens distributed in this manner may be invalid. Hence, the voters placed using these voter tokens may be invalid. Therefore, an election as a whole may be invalid responsive to an invalid organizer transaction.

In some cases, an election may be invalid based on a threshold number of invalid transactions. For example, if a majority (or other fraction) of the voter transactions are invalid, the entire election may be invalidated. In some cases, the threshold number may be determined based on the results. For example, if the vote-value purportedly transferred in the invalid transactions could have changed the election result, the election may be invalidated.

Additionally or alternatively, the BAL 400 may verify transactions by performing range-proofs (e.g., by accessing range-proof tokens) on the individual tokens transferred by the transactions. The BAL 400 may access a range-proof token (414). The BAL 400 may perform the range-proof (416). In various implementations, the validity token (e.g., generated in 412 above) may include a validity indication based on the range-proof in addition to or in place of the verification based on the summation information.

Figure 6:
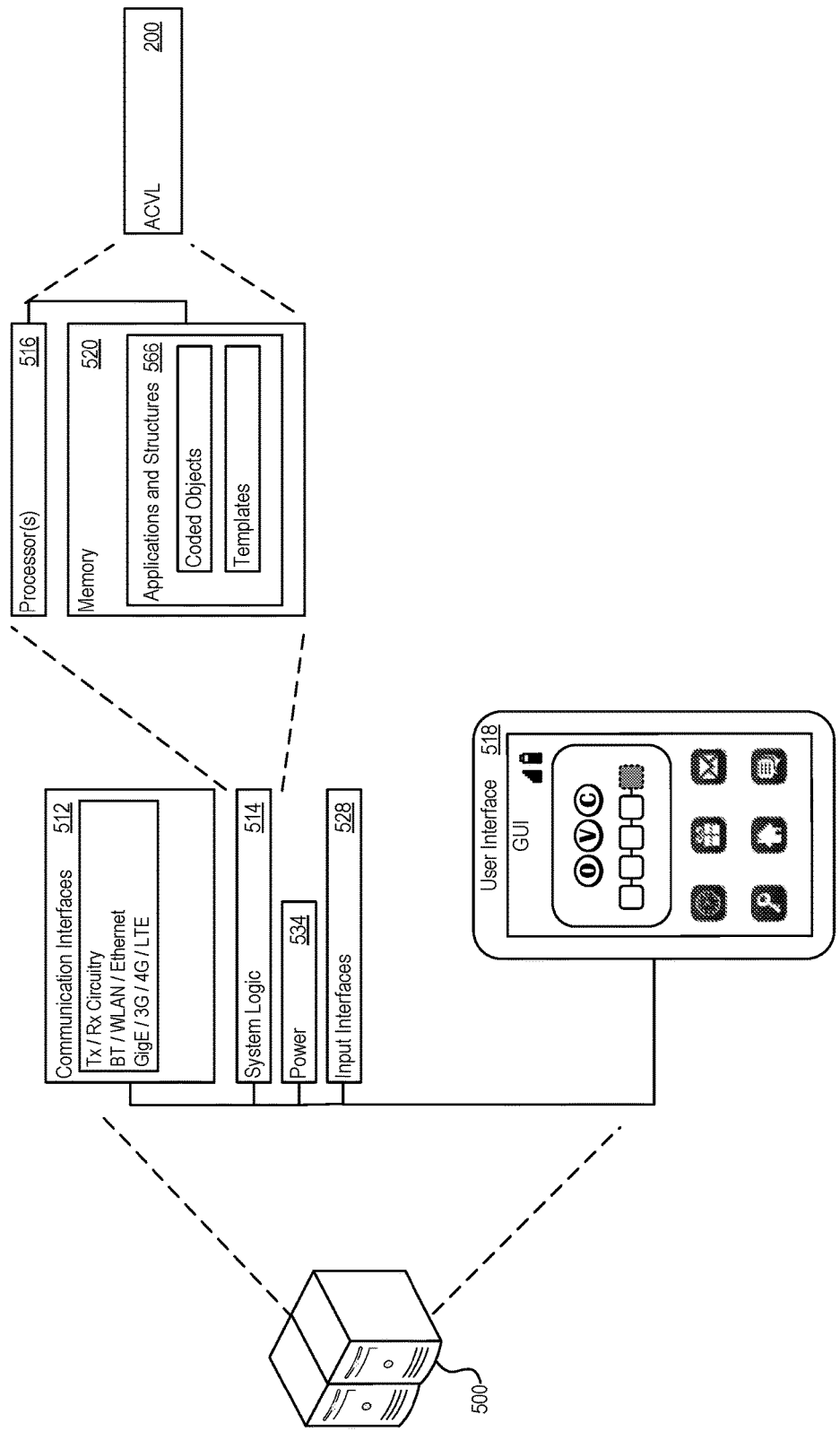
FIG. 6 shows an example voting logic execution environment.
Figure 7:
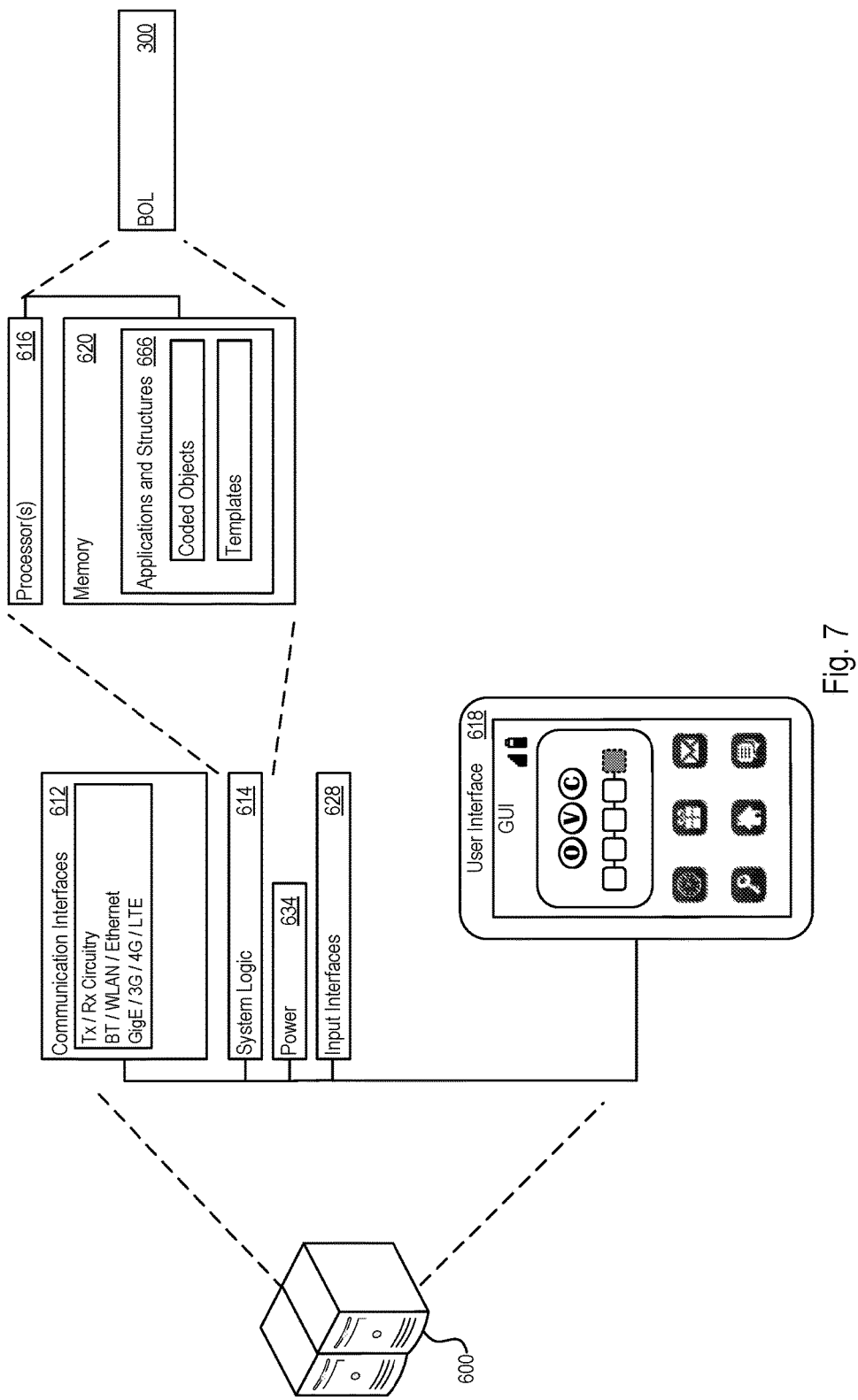
FIG. 7 shows an example organization logic execution environment.

The ACVL 200, BOL 300, and/or the BAL 400 may be implemented on circuitry present in various execution environments. FIGS. 5, 6, and 7 show example execution environments for the ACVL 200, BOL 300, and/or the BAL 400. In various implementations, underlying hardware for implementing the execution of any of the ACVL 200, BOL 300, and/or the BAL 400 may be used to implement execution or one more of the others.

Referring now to FIG. 6, an example voting logic execution environment (VLEE) 500 is shown. The example VLEE 500 may serve as a hardware platform for the ACVL 200. The VLEE 500 may include system logic 514. The system logic may include processors 516, memory 520, and/or other circuitry.

The memory 520 along with the processors 516 may support execution of the ACVL 200. The memory 520 may further include applications and structures 566, for example, coded objects, templates, or other structures to support voter token reception, committed token distribution, and generation of tokens.

The VLEE 500 may also include communication interfaces 512, which may support wireless, e.g. Bluetooth, Wi-Fi, WLAN, cellular (4G, LTE/A), and/or wired, Ethernet, Gigabit Ethernet, optical networking protocols. The communication interfaces 512 may also include serial interfaces, such as universal serial bus (USB), serial ATA, IEEE 1394, lighting port, $I^2C$, slimBus, or other serial interfaces.

The VLEE 500 may include power functions 534 and various input interfaces 528. The VLEE may also include a user interface 518 that may include human-to-machine interface devices and/or graphical user interfaces (GUI). In various implementations, the system logic 514 may be distributed over multiple physical servers and/or be implemented as a virtual machine.

In some cases, the VLEE 500 may be a specifically defined computational system deployed in a cloud platform. In some cases, the parameters defining the VLEE 500 may be specified in a manifest for cloud deployment. The manifest may be used by an operator to requisition cloud based hardware resources, and then deploy the logical components, for example, ACVL 200, of the VLEE 500 onto the hardware resources. In some cases, a manifest may be stored as a preference file such as a YAML (yet another mark-up language), JavaScript object notation (JSON), or other preference file type.

Referring now to FIG. 7, an example organization logic execution environment (OLEE) 600 is shown. The example OLEE 600 may serve as a hardware platform for the BOL 300. The OLEE 600 may include system logic 614. The system logic may include processors 616, memory 620, and/or other circuitry.

The memory 620 along with the processors 616 may support execution of the BOL 300. The memory 620 may further include applications and structures 666, for example, coded objects, templates, or other structures to support organizer token establishment, ballot generation/establishment, and generation of tokens.

The OLEE 600 may also include communication interfaces 612, which may support wireless, e.g. Bluetooth, Wi-Fi, WLAN, cellular (4G, LTE/A), and/or wired, Ethernet, Gigabit Ethernet, optical networking protocols. The communication interfaces 612 may also include serial interfaces, such as universal serial bus (USB), serial ATA, IEEE 1394, lighting port, I$^2$C, slimBus, or other serial interfaces. The OLEE 600 may include power functions 634 and various input interfaces 628. The OLEE may also include a user interface 618 that may include human-to-machine interface devices and/or graphical user interfaces (GUI). In various implementations, the system logic 614 may be distributed over multiple physical servers and/or be implemented as a virtual machine.

In some cases, the OLEE 600 may be a specifically defined computational system deployed in a cloud platform. In some cases, the parameters defining the OLEE 600 may be specified in a manifest for cloud deployment. The manifest may be used by an operator to requisition cloud based hardware resources, and then deploy the logical components, for example, BOL 300, of the OLEE 600 onto the hardware resources. In some cases, a manifest may be stored as a preference file such as a YAML (yet another mark-up language), JavaScript object notation (JSON), or other preference file type.

Figure 8:
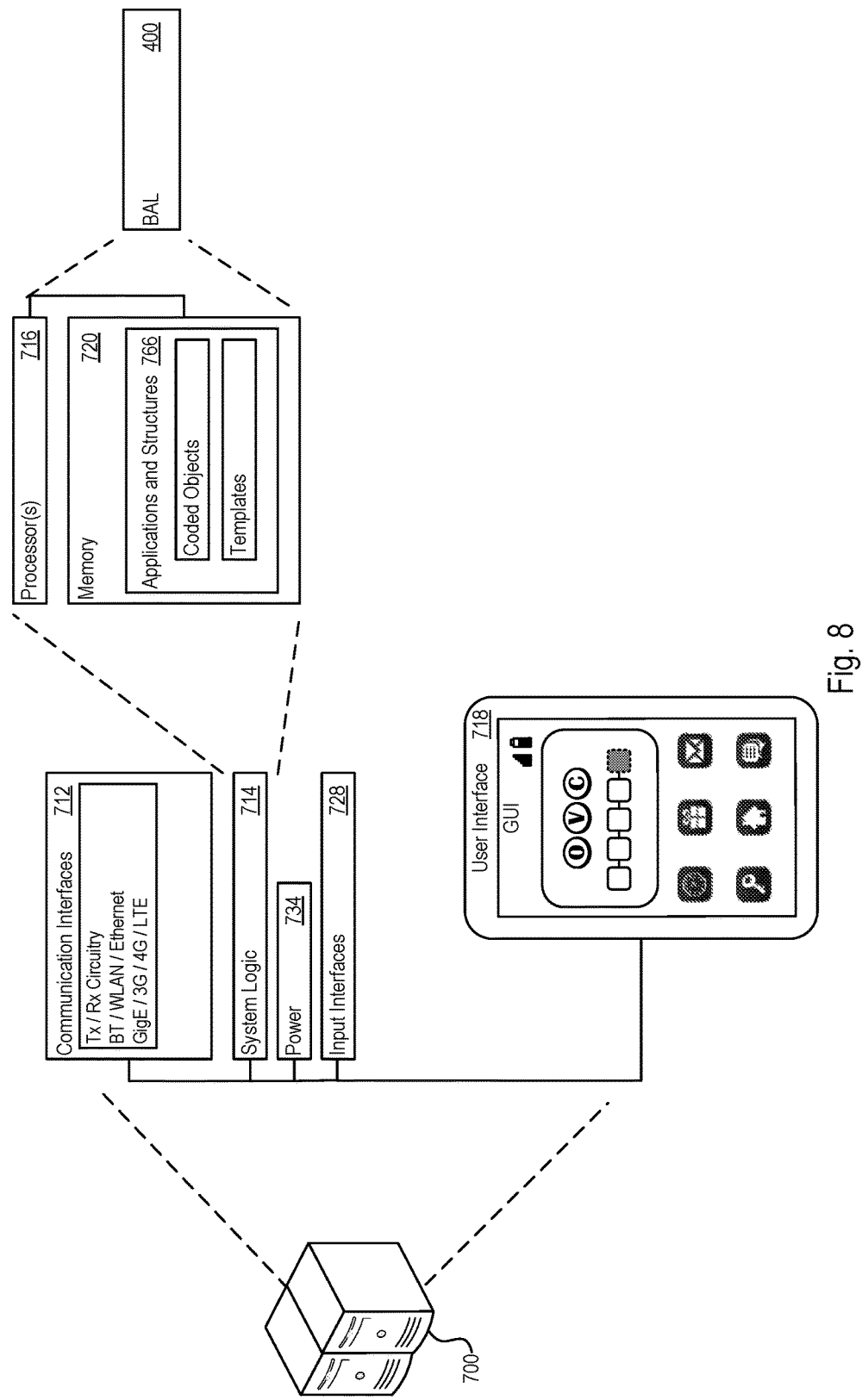
FIG. 8 shows an example auditing logic execution environment.

Referring now to FIG. 8, an example auditing logic execution environment (ALEE) 700 is shown. The example ALEE 700 may serve as a hardware platform for the BAL 400. The ALEE 700 may include system logic 714. The system logic may include processors 716, memory 720, and/or other circuitry.

The memory 720 along with the processors 716 may support execution of the BAL 400. The memory 720 may further include applications and structures 766, for example, coded objects, templates, or other structures to support transaction verification, range-proof execution, and generation of validity tokens.

The ALEE 700 may also include communication interfaces 712, which may support wireless, e.g. Bluetooth, Wi-Fi, WLAN, cellular (4G, LTE/A), and/or wired, Ethernet, Gigabit Ethernet, optical networking protocols. The communication interfaces 712 may also include serial interfaces, such as universal serial bus (USB), serial ATA, IEEE 1394, lighting port, I$^2$C, slimBus, or other serial interfaces. The ALEE 700 may include power functions 734 and various input interfaces 728. The ALEE may also include a user interface 718 that may include human-to-machine interface devices and/or graphical user interfaces (GUI). In various implementations, the system logic 714 may be distributed over multiple physical servers and/or be implemented as a virtual machine.

In some cases, the ALEE 700 may be a specifically defined computational system deployed in a cloud platform. In some cases, the parameters defining the ALEE 700 may be specified in a manifest for cloud deployment. The manifest may be used by an operator to requisition cloud based hardware resources, and then deploy the logical components, for example, BAL 400, of the ALEE 700 onto the hardware resources. In some cases, a manifest may be stored as a preference file such as a YAML (yet another mark-up language), JavaScript object notation (JSON), or other preference file type.

As discussed above, the underlying hardware of the execution environments may concurrently implement multiple ones of the execution environments. In some cases, concurrent implementation may be used to support operation of a particular node in accord with multiple roles. Further, any of the VLEE 500, OLEE 600, and ALEE 700 may be used to implement the decryption and analysis operations of the answer roles.

Moving now to a discussion of voter anonymity, in various implementations, committed tokens may preserve voter pseudonymity. For example, an answer may be able to determine which voter identities provided committed tokens to that answer. In other words, a voter may be anonymous to general auditors (e.g., general auditors may not necessarily know which answers a particular voter identity sent non-zero vote-value to), but pseudonymous to the answer roles (e.g., the answer may have knowledge of particular vote-value amounts transferred from particular voter identifiers). However, through history analysis, data breach, or the security lapses, a pseudonymous voter identity may be connected to a personal identity of a voter.

Figure 9:
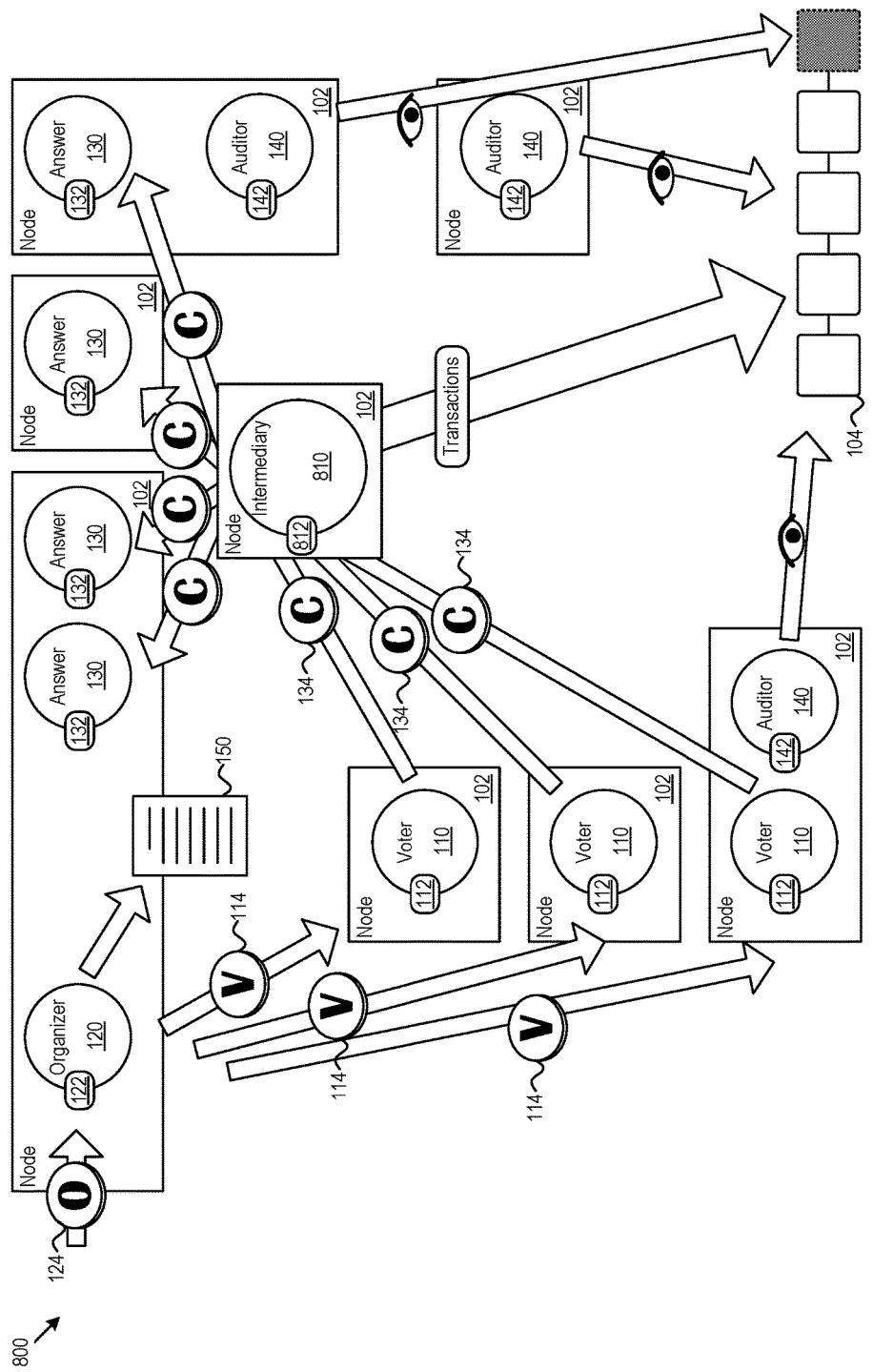
FIG. 9 shows an example intermediary balloting environment.

In some implementations, vote-value compiling (e.g., mixing and/or other intermediary role obfuscation) may be used to provide additional protection for voter anonymity against answer roles. FIG. 9 shows an example intermediary balloting environment 800. In the intermediary example balloting environment 800, voters 110 send committed tokens to an intermediary 810, e.g., via an intermediary identifier 812. The intermediary 810 may mix or otherwise obfuscate individual vote-value transfers and provide a compiled token with a compiled vote-value transfer to the answers with individual pseudonymous voter identities stripped.

Use of intermediaries may shift anonymity preservation issues from the answer to the intermediary. In some cases, a voter may have control of the intermediary selection. For example, an organizer may select answers, but a voter may freely designate an intermediary (or select an intermediate from a listing of allowed intermediaries). Accordingly, the voter may have more trust in the intermediary than the answer because the voter may control the selection of intermediaries while the organizer designates the answers.

Figure 10:
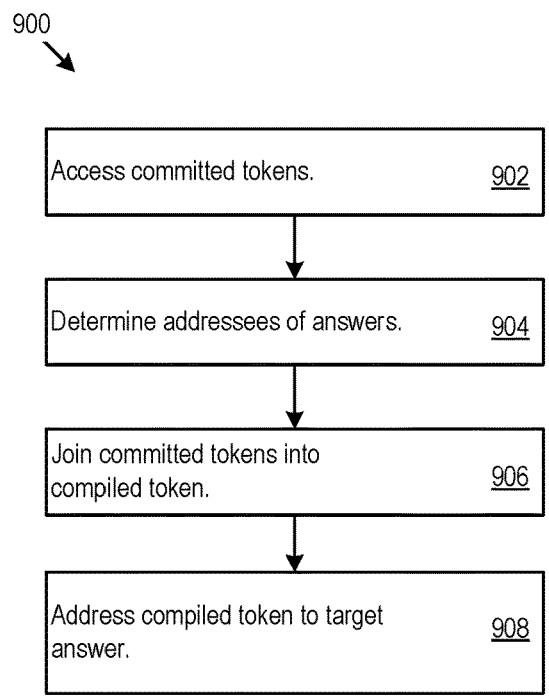
FIG. 10 example intermediary vote-value compiling logic

Referring now to FIG. 10, example intermediary vote-value compiling logic (IVCL) 900 is shown. The IVCL 900 may access committed tokens transferred to the IVCL's custody (902). The IVCL 900 may determine which of answers the individual committed tokens are targeted to (904). The IVCL 900 may compile the vote-value in committed tokens targeted to a particular answer into to a compiled token. The IVCL 900 may request a compiling transaction, the compiling transaction joining multiple tokens targeted to a particular answer into a single compiled token (906). The IVCL 900 may address the compiled token to the answer identifier (908).

In an example scenario, the IVCL 900 requests a compiling transaction that includes a compiled token addressed to a particular answer. The vote-value in the compiled token may be justified using committed tokens. The IVCL 900 may identify the committed tokens addressed to each answer. The compiling transaction may provide summation information and/or range proofs for the committed tokens. The summation information may be used by auditors to confirm that the vote-value in the committed tokens is the same as the vote-value in the compiled token. The voters, e.g., through the ACVL 200 may certify the compiled transaction by recording signed tokens to DLT record. The signed tokens may confirm that the IVCL 900 correctly identified the addressees of the voters' committed tokens. Confidence in the electronics results may increase with increasing numbers of signed tokens from distinct voters. The intermediary balloting environment may protect voter anonymity with respect to the answers by shifting the pseudonymity to the intermediary. The voters may send committed tokens to multiple answers. Accordingly, identifying a particular token from a voter as being addressed to a particular answer does not necessarily divulge the vote-value committed within the token or that any vote-value was actually committed by the answer.

In various implementations, peer-to-peer mixing may be used. Implementations, such as ValueShuffle, DiceMix, CoinShuffle++ described in Ruffing and Moreno-Sanchez, Mixing Confidential Transactions: Comprehensive Transaction Privacy for Bitcoin, 2017, http://eprint.iacr.org/2017/238.pdf may be used. Therein, ValueShuffle and CoinShuffle++ are described as allowing transaction privacy though mixing in homomorphic commitments. The schemes take advantage of the additive properties of the homomorphic commitments. For example, the schemes provide sums and differences of values used in a transaction without disclosing the sums themselves. In this case, when generating tokens, the ACVL 200 (or other token transferring logic) may provide sums and/or differences of transaction vote-values and blinding values in place of the actual values that are encrypted using the public key of the recipient of the committed token. These sums/differences allow the answer to determine that sum of the vote-value received from multiple tokens, but not necessarily the ability to determine individual vote-values from individual tokens. The schemes may be adapted but substituting Bitcoin values transferred in the transactions with vote-value transfers. Accordingly, using the above-described peer-to-peer mixing schemes anonymity may be preserved against roles other than the voter casting the vote. In peer-to-peer mixing the intermediary may not necessarily be includes to protect anonymity. Hence, non-intermediary balloting environments may be used (e.g., example balloting environment 100).

The methods, devices, architectures, processing, circuitry, and logic described above may be implemented in many different ways and in many different combinations of hardware and software. For example, all or parts of the implementations may be circuitry that includes an instruction processor, such as a Central Processing Unit (CPU), microcontroller, or a microprocessor; or as an Application Specific Integrated Circuit (ASIC), Programmable Logic Device (PLD), or Field Programmable Gate Array (FPGA); or as circuitry that includes discrete logic or other circuit components, including analog circuit components, digital circuit components or both; or any combination thereof. The circuitry may include discrete interconnected hardware components or may be combined on a single integrated circuit die, distributed among multiple integrated circuit dies, or implemented in a Multiple Chip Module (MCM) of multiple integrated circuit dies in a common package, as examples.

Accordingly, the circuitry may store or access instructions for execution, or may implement its functionality in hardware alone. The instructions may be stored in a tangible storage medium that is other than a transitory signal, such as a flash memory, a Random Access Memory (RAM), a Read Only Memory (ROM), an Erasable Programmable Read Only Memory (EPROM); or on a magnetic or optical disc, such as a Compact Disc Read Only Memory (CDROM), Hard Disk Drive (HDD), or other magnetic or optical disk; or in or on another machine-readable medium. A product, such as a computer program product, may include a storage medium and instructions stored in or on the medium, and the instructions when executed by the circuitry in a device may cause the device to implement any of the processing described above or illustrated in the drawings.

The implementations may be distributed. For instance, the circuitry may include multiple distinct system components, such as multiple processors and memories, and may span multiple distributed processing systems. Parameters, databases, and other data structures may be separately stored and managed, may be incorporated into a single memory or database, may be logically and physically organized in many different ways, and may be implemented in many different ways. Example implementations include linked lists, program variables, hash tables, arrays, records (e.g., database records), objects, and implicit storage mechanisms. Instructions may form parts (e.g., subroutines or other code sections) of a single program, may form multiple separate programs, may be distributed across multiple memories and processors, and may be implemented in many different ways. Example implementations include stand-alone programs, and as part of a library, such as a shared library like a Dynamic Link Library (DLL). The library, for example, may contain shared data and one or more shared programs that include instructions that perform any of the processing described above or illustrated in the drawings, when executed by the circuitry.

A1 In an example, a cryptographic voting method includes: obtaining a ballot established on a distributed ledger, the ballot designating answers with corresponding answer identifiers; receiving, a voter token, the voter token conferring a voter vote-value to a voter, the voter token received responsive to a transaction on the distributed ledger addressed to a voter identifier of the voter; determining a target committed vote-value to assign to a target answer of the answers, the target committed vote-value including at least a portion of the voter vote-value; generating a target committed token, the target committed token configured to bind the voter to the target committed vote-value without revealing the target committed vote-value while in a cryptographic form; determining a completion committed vote-value to assign to a second answer of the answers, the completion committed vote-value including a null or another portion of the voter vote-value; generating a completion committed token configured to bind the voter to the completion committed vote-value without revealing the completion committed vote-value while in the cryptographic form; and requesting a second transaction on the distributed ledger transferring the completion committed token to the corresponding answer identifier of the second answer.

A2 The cryptographic voting method of example A1, where the first and second transactions includes the same transaction.

A3 The cryptographic voting method of either of examples A1 or A2, where: the completion committed vote-value includes a null; and requesting the second transaction includes obfuscating a transfer of at least the portion of the vote-value transferred to the target answer.

A4 The cryptographic voting method of any of examples A1-A3, where: the voter identifier is associated with a public key of the voter; and digitally signing the target committed token using a private key paired with the public key.

A5 The cryptographic voting method of any of examples A1-A4, further including deducting the target committed vote-value and the completion vote-value from the voter vote-value.

A6 The cryptographic voting method of example A5, where deducting the completion vote-value includes producing a resultant null voter vote-value.

A7 The cryptographic voting method of any of examples A1-A6, further including sending a rest token back to the voter, the rest token including a remainder vote-value after the second transaction.

A8 The cryptographic voting method of any of examples A1-A7, where generating the target committed token includes: applying the target committed vote value to an amount point on an elliptic curve to generate an amount term; applying a random blinding value to a blinding point on the elliptic curve to generate a blinding term; and combining the amount term and the blinding term.

A9 The cryptographic voting method of example A8, further including selecting the blinding point by applying a hash function to the amount point.

A10 The cryptographic voting method of any of examples A1-A9, further including generating a range-proof token, the range-proof token configured to, when compared to the target committed token, establish that the target committed vote-value is within an allowed range for the ballot.

B1 In an example, a cryptographic voting method includes: accessing, a ballot established on a blockchain, the ballot designating multiple answers with corresponding answer identifiers; determining a vote-value distribution to assign to the multiple answers, the vote-value distribution distributing a voter vote-value received within a voter token; generating a committed token for each of the multiple answers, the committed tokens configured to bind a voter the vote-value distribution without revealing individual committed vote-values within individual committed tokens of the committed tokens while the committed tokens are in a cryptographic form; and at least one of the committed tokens including a null vote-value; and requesting a transaction on the blockchain transferring the committed tokens to the multiple answers, where transferring at least one of the committed tokens including the null vote-value obfuscates the vote-value distribution.

B2 The cryptographic voting method of example B1, where generating the committed token for each of the multiple answers includes: applying the individual committed vote-values to an amount point on an elliptic curve to generate individual amount terms; applying random blinding values to a blinding point on the elliptic curve to generate individual blinding terms; and combining the individual amount terms and the individual blinding terms.

B3 The cryptographic voting method of example B2, further including selecting the blinding point by applying a hash function to the amount point.

B4 The cryptographic voting method of any of examples B1-B3, further including: generating a rest token configured to transfer a remainder vote-value; and requesting the transaction on the blockchain further includes requesting a transfer of the rest token back to the voter.

C1 In an example, a cryptographic voting system includes: network interface circuitry configured to: obtain a ballot established on a distributed ledger, the ballot designating answers with corresponding answer identifiers; and receive, a voter token, the voter token conferring a voter vote-value to a voter, the voter token received responsive to a transaction on the distributed ledger addressed to a voter identifier of the voter; cryptologic voting circuitry in communication with the network interface circuitry, the cryptologic voting circuitry configured to: determine a target committed vote-value to assign to a target answer of the answers, the target committed vote-value including at least a portion of the voter vote-value; generate a target committed token, the target committed token configured to bind the voter to the target committed vote-value without revealing the target committed vote-value while in a cryptographic form; using a cryptographic key associated with the voter identifier, request a first transaction on the distributed ledger transferring the target committed token to the corresponding answer identifier of the target answer; determine a completion committed vote-value to assign to a second answer of the answers, the completion committed vote-value including a null or another portion of the voter vote-value; generate a completion committed token configured to bind the voter to the completion committed vote-value without revealing the completion committed vote-value while in the cryptographic form; and using the cryptographic key associated with the voter identifier, request a second transaction on the distributed ledger transferring the completion committed token to the corresponding answer identifier of the second answer.

C2 The cryptographic voting system of example C1, where the first and second transactions includes the same transaction.

C3 The cryptographic voting system of either of examples C1 or C2, where: the completion committed vote-value includes a null; and the cryptologic voting circuitry is configured to request the second transaction by obfuscating a transfer of at least the portion of the vote-value transferred to the target answer.

C4 The cryptographic voting system of any of examples C1-C3, where: the voter identifier includes a public key of the voter; and the cryptologic voting circuitry is configured to use the cryptographic key by digitally signing the target committed token using a private key paired with the public key.

C5 The cryptographic voting system of any of examples C1-C4, the cryptologic voting circuitry is further configured to deduct the target committed vote-value and the completion vote-value from the voter vote-value.

C6 The cryptographic voting system of example C5, where the cryptologic voting circuitry is configured to deduct the completion vote-value by producing a resultant null voter vote-value.

D1 In an example, a cryptographic voting method includes: accessing a ballot that designates answers; determining a vote-value distribution; causing generation of a compiled token by mixing a vote-value with vote-value from another voter; and causing a request for a transaction conveying the compiled token to a first one of the answers.

D2 The cryptographic voting method of example D1, where mixing a vote-value includes executing a peer-to-peer mixing scheme.

D3 The cryptographic voting method of example D2, where executing a peer-to-peer mixing scheme includes executing the peer-to-peer mixing scheme without an intermediary.

D4 The cryptographic voting method of example D1 where mixing a vote-value includes requesting a transaction to convey the vote-value to an intermediary.

D4 The cryptographic voting method of example D1, further including implementing any of the features of any of examples A1-A10 and B1-B4.

E1 In an example, a cryptographic voting organization method includes: generating a ballot with an answer, the answer including an answer identifier configured to: direct reception of a committed token including a committed vote-value transferred from a voter, the committed token configured to bind a the voter to the committed vote-value without revealing the committed vote-value while in an cryptographic form, the committed vote-value including a null or at least a portion of a voter vote-value; generating an organizer token including an organizer vote-value; establishing, on a distributed ledger, the ballot and the organizer token; determining a vote-value distribution; requesting a transaction transferring a voter token to an voter identifier of the voter, the voter token conferring the voter vote-value to the voter; and accounting for the transaction by deducting the voter vote-value from the organizer vote-value.

E2 The cryptographic voting organization method of example E1, where requesting the transaction further includes requesting that the transaction send a rest token back to the organizer, the rest token including a remainder vote-value corresponding to the organizer vote-value with at least the voter vote-value deducted.

E3 The cryptographic voting method of either of examples E1 or E2, where generating the ballot includes generating a ballot allowing non-integer vote-value transfers.

E4 The cryptographic voting organization method of any of examples E1-E3, where generating the ballot includes designating an allowed range for vote-value transfers for the ballot.

E5 The cryptographic voting organization method of any of examples E1-E4, where generating the ballot includes designating a public key to serve as the answer identifier.

E6 The cryptographic voting organization method of any of examples E1-E5, where generating the ballot includes designating a public key to serve as the voter identifier.

E7 The cryptographic voting organization method of example E6, a structure for the transaction includes: the voter token; an amount field designating the voter vote-value, the amount field encrypted with the public key; and a blinding field designating a blinding factor used to obfuscate the amount field, the blinding field encrypted with the public key.

E8 The cryptographic voting organization method of any of examples E1-E7, where: the distributed ledger includes a blockchain; and establishing the ballot and the organizer token includes: causing the ballot to be recorded on the blockchain; and designating a public key to serve as an organizer identifier.

E9 The cryptographic voting organization method of any of examples E1-E8, generating a ballot further includes designating multiple points on an elliptic curve for generation of token for transferring vote-value, the multiple points including: an amount point; and a blinding point.

E10 The cryptographic voting organization method of example E9, where: designating an amount point includes designating a cryptographic key to apply to a curve generation function for the elliptic curve; and designating a blinding point includes designating a hash function to apply to the amount point to generate the blinding point.

F1 In an example, a cryptographic voting organization system includes: memory configured to store a distributed ledger; and ballot organization circuitry in data communication with the memory, the ballot organization circuitry configured to: generate a ballot with an answer, the answer including an answer identifier configured to: direct reception of a committed token including a committed vote-value transferred from a voter, the committed token configured to bind a the voter to the committed vote-value without revealing the committed vote-value while in an cryptographic form, the committed vote-value including a null or at least a portion of a voter vote-value; generate an organizer token including an organizer vote-value; establish, on the distributed ledger, the ballot and the organizer token; determine a vote-value distribution; request a transaction transferring a voter token to an voter identifier of the voter, the voter token conferring the voter vote-value to the voter; and account for the transaction by deducting the voter vote-value from the organizer vote-value.

F2 The cryptographic voting organization system of example F1, where the ballot organization circuitry is further configured to request the transaction further by requesting that the transaction send a rest token back to the organizer, the rest token including a remainder vote-value corresponding to the organizer vote-value with at least the voter vote-value deducted.

F3 The cryptographic voting organization system of either of examples F1 or F2, where the ballot organization circuitry is further configured to generate the ballot by generating a ballot allowing non-integer vote-value transfers.

F4 The cryptographic voting organization system of any of examples F1-F3, where the ballot organization circuitry is further configured to generate the ballot by designating an allowed range for vote-value transfers for the ballot.

F5 The cryptographic voting organization system of any of examples F1-F4, where the ballot organization circuitry is further configured to generate the ballot by designating a public key to serve as the answer identifier.

F6 The cryptographic voting organization system of any of examples F1-F5, where generating the ballot includes designating a public key to serve as the voter identifier.

F7 The cryptographic voting organization system of example F6, where the ballot organization circuitry is further configured to generate the ballot by designating a structure for the transaction, the structure including: the voter token; an amount field designating the voter vote-value, the amount field encrypted with the public key; and a blinding field designating a blinding factor used to obfuscate the amount field, the blinding field encrypted with the public key.

G1 In an example, a product includes machine-readable media other than a transitory signal; and instructions stored on the machine-readable media, the instructions configured to, when executed, cause a machine to: generate a ballot with an answer, the answer including an answer identifier configured to: direct reception of a committed token including a committed vote-value transferred from a voter, the committed token configured to bind a the voter to the committed vote-value without revealing the committed vote-value while in an cryptographic form, the committed vote-value including a null or at least a portion of a voter vote-value; generate an organizer token including an organizer vote-value; establish, on a distributed ledger, the ballot and the organizer token; determine a vote-value distribution; request a transaction transferring a voter token to an voter identifier of the voter, the voter token conferring the voter vote-value to the voter; and account for the transaction by deducting the voter vote-value from the organizer vote-value.

G2 The product of example G1, the instructions are further configured to cause the machine to generate a ballot further by designating multiple points on an elliptic curve for generation of token for transferring vote-value, the multiple points including: an amount point; and a blinding point.

G3 The product of example G2, the instructions are further configured to cause the machine to: designate an amount point by designating a cryptographic key to apply to a curve generation function for the elliptic curve; and designate a blinding point by designating a hash function to apply to the amount point to generate the blinding point.

H1 In an example, a cryptographic vote auditing method includes: increasing the security and accuracy of a distributed-ledger-based cryptographic ballot system by: accessing a ballot recorded on a distributed ledger, the ballot establishing an answer with a corresponding answer identifier; accessing a voter transaction recorded on the distributed ledger; accessing a first voter token referenced within the voter transaction, the first voter token transferring a voter vote-value for committed vote-value within committed tokens assigned by the transaction, the committed tokens configured to bind the voters to the committed vote-values without revealing the individual committed vote-values while in the cryptographic form, each of the committed vote-values including a null or at least a portion of a voter vote-value; verifying the validity of the committed tokens by: without dependence on knowledge of individual committed vote-values, determining a verification sum by analyzing voter summation information for each of the committed tokens; and comparing the verification sum to the first voter token; and responsive to verifying the validity of the voter transaction, generating a validity indication.

H2 The cryptographic voting auditing method of example H1, further including recording the validity indication to the distributed ledger as a validity token.

H3 The cryptographic voting auditing method of either of examples H1 or H2, where comparing the verification sum to the first voter token includes determining a mismatch between the verification sum and the first voter token, while the first voter token is in the cryptographic form.

H4 The cryptographic voting auditing method of example H3, where the summation information includes information extracted from a range-proof token provided within the voter transaction.

H5 The cryptographic voting auditing method of either of examples H3 or H4, further including recording the validity indication to the distributed ledger to invalidate the voter transaction.

H6 The cryptographic voting auditing method of any of examples H3-H5, further including recording the validity indication to the distributed ledger to request a change to the voter transaction to match the verification sum.

H7 The cryptographic voting auditing method of any of examples H1-H6, further including: accessing an organizer token established on the distributed ledger, the organizer token establishing an organizer vote-value; and accessing an organizer transaction recorded on the distributed ledger, the organizer transaction: referencing an organizer token designating an organizer vote value; conferring voter tokens, the voter tokens including the first voter token, to voters via voter identifiers for the voters using the organizer token as a source token; and providing organizer summation information for each of the voter tokens.

H8 The cryptographic voting auditing method of example H7, where verifying the validity of the voter transaction further includes comparing the organizer token to the organizer summation information.

H9 The cryptographic voting auditing method of any of examples H1-H8, where: the method further includes accessing a range-proof token within the voter transaction; and verifying the validity of the voter transaction further includes comparing the range-proof token to a first committed token of the committed tokens to determine whether a first committed vote-value transferred via the first committed token is within an allowed range for the ballot.

H10 The cryptographic voting auditing method of example H9, further including determining that the first committed vote-value is within the allowed range for the ballot by determining that the vote-value is non-negative.

H11 The cryptographic voting auditing method of any of examples H1-H10, where analyzing summation information includes summing over keys stored within a range-proof token within the voter transaction.

H12 The cryptographic voting auditing method of any of examples H1-H10, where verifying the validity of the committed tokens includes comparing the recipient identifier of the first voter token to a voter identifier for a voter that requested the voter transaction.

I1 In an example, a cryptographic vote auditing system includes: network interface circuitry configured to: access a ballot recorded on a distributed ledger, the ballot establishing an answer with a corresponding answer identifier; access a voter transaction recorded on the distributed ledger; and access a first voter token referenced within the voter transaction, the first voter token transferring a voter vote-value for committed vote-value within committed tokens assigned by the transaction, the committed tokens configured to bind the voters to the committed vote-values without revealing the individual committed vote-values while in the cryptographic form, each of the committed vote-values including a null or at least a portion of a voter vote-value; and ballot auditing circuitry in data communication with the network interface circuitry, the ballot auditing circuitry configured to: verify the validity of the committed tokens by: comparing the recipient identifier of the first voter token to a voter identifier for a voter that requested the voter transaction; without dependence on knowledge of individual committed vote-values, determining a verification sum by analyzing voter summation information for each of the committed tokens; and comparing the verification sum to the first voter token; and responsive to verifying the validity of the voter transaction, generate a validity indication.

I2 The cryptographic voting auditing system of example I1, where the ballot auditing circuitry is further configured to record the validity indication to the distributed ledger as a validity token.

I3 The cryptographic voting auditing system of either of examples I1 or I2, where the ballot auditing circuitry is further configured to compare the verification sum to the first voter token by determining a mismatch between the verification sum and the first voter token, while the first voter token is in the cryptographic form.

I4 The cryptographic voting auditing system of example I3, where the summation information includes information extracted from a range-proof token provided within the voter transaction.

I5 The cryptographic voting organization system of either of examples I4 or I3, where the ballot auditing circuitry is further configured to record the validity indication to the distributed ledger to invalidate the voter transaction.

I6 The cryptographic voting auditing system of any of examples I1-I5, where the ballot auditing circuitry is further configured to record the validity indication to the distributed ledger to request a change to the voter transaction to match the verification sum.

I7 The cryptographic voting auditing system of any of examples I1-I6, where the ballot auditing circuitry is further configured to: access an organizer token established on the distributed ledger, the organizer token establishing an organizer vote-value; and access an organizer transaction recorded on the distributed ledger, the organizer transaction: referencing an organizer token designating an organizer vote value; conferring voter tokens, the voter tokens including the first voter token, to voters via voter identifiers for the voters using the organizer token as a source token; and providing organizer summation information for each of the voter tokens.

J1 In an example, a product includes: machine-readable media other than a transitory signal; and instructions stored on the machine-readable media, the instructions configured to, when executed cause a machine to: access a ballot recorded on a distributed ledger, the ballot establishing an answer with a corresponding answer identifier; access a voter transaction recorded on the distributed ledger; access a first voter token referenced within the voter transaction, the first voter token transferring a voter vote-value for committed vote-value within committed tokens assigned by the transaction, the committed tokens configured to bind the voters to the committed vote-values without revealing the individual committed vote-values while in the cryptographic form, each of the committed vote-values including a null or at least a portion of a voter vote-value; verify the validity of the committed tokens by: comparing the recipient identifier of the first voter token to a voter identifier for a voter that requested the voter transaction; without dependence on knowledge of individual committed vote-values, determining a verification sum by analyzing voter summation information for each of the committed tokens; and comparing the verification sum to the first voter token; and responsive to verifying the validity of the voter transaction, generate a validity indication. J2 The product of example J1, where the instructions are further configured to analyze summation information by summing over keys stored within a range-proof token within the voter transaction.

K1 In an example, a system includes circuitry configured to implement the cryptographic voting method of any of examples A1-A10, B1-B4, D1-D4, E1-E11, and H1-H12.

L1 In an example, a product includes instructions stored on a machine readable medium, the instructions configured to cause a machine to implement the cryptographic voting method of any of examples A1-A10, B1-B4, D1-D4, E1-E11, and H1-H12.

M1 In an example, a method includes implementing any of or any combination of the features described in the preceding disclosure.

N1 In an example, a system is configured to implement any of or any combination of the features described in the preceding disclosure.

Various implementations have been specifically described. However, many other implementations are also possible. Various implementations have been specifically described. However, many other implementations are also possible. For instance, any of the components and functionality in the architecture may be hosted in virtual machines managed by a cloud services provider. That is, while some implementations may be completely localized within a given enterprise, other implementations are completely migrated into the cloud, or are hybrid implementations with mixed local and cloud implementation. Regarding querying devices, the smartphones applications and desktop computers noted above are just particular examples, and other querying devices may be used, including hands-free systems in vehicles, digital personal assistants in smartphones or desktop PCs, hands-free control systems for the home, and many other types of devices.

What is claimed is:

1. A cryptographic voting method including:
   obtaining a ballot established on a distributed ledger,
      the ballot designating answers with corresponding answer identifiers;
   receiving, a voter token, the voter token conferring a voter vote-value to a voter, the voter token received responsive to a transaction on the distributed ledger, and the transaction addressed to a voter identifier of the voter;
   determining a target committed vote-value to assign to a target answer of the answers, the target committed vote-value including at least a portion of the voter vote-value;
   generating a target committed token,
      the target committed token configured to bind the voter to the target committed vote-value without revealing the target committed vote-value while in a cryptographic form;
   requesting a first transaction on the distributed ledger,
      the first transaction transferring the target committed token to the corresponding answer identifier of the target answer;
   determining a completion committed vote-value to assign to a second answer of the answers,
      the completion committed vote-value including:
      a null, or
      another portion of the voter vote-value;
   generating a completion committed token configured to:
      bind the voter to the completion committed vote-value without revealing the completion committed vote-value while in the cryptographic form; and
   requesting a second transaction on the distributed ledger, and
      the second transaction transferring the completion committed token to the corresponding answer identifier of the second answer.

2. The cryptographic voting method of claim 1, where the first and second transactions include the same transaction.

3. The cryptographic voting method of claim 1, where:
   the completion committed vote-value includes a null; and
   requesting the second transaction includes obfuscating a transfer of at least the portion of the vote-value transferred to the target answer.

4. The cryptographic voting method of claim 1, where the voter identifier is associated with a public key of the voter; and
   the method further comprises using the public key to digitally sign the target committed token using a private key paired with the public key.

5. The cryptographic voting method of claim 1, further including deducting the target committed vote-value and the completion vote-value from the voter vote-value.

6. The cryptographic voting method of claim 5, where deducting the completion vote-value includes producing a resultant null voter vote-value.

7. The cryptographic voting method of claim 1, further including sending a rest token back to the voter, the rest token including a remainder vote-value after the second transaction.

8. The cryptographic voting method of claim 1, where generating the target committed token includes:
applying the target committed vote value to an amount point on an elliptic curve to generate an amount term;
applying a random blinding value to a blinding point on the elliptic curve to generate a blinding term; and
combining the amount term and the blinding term.

9. The cryptographic voting method of claim 8, further including selecting the blinding point by applying a hash function to the amount point.

10. The cryptographic voting method of claim 1, further including generating a range-proof token, the range-proof token configured to, when compared to the target committed token, establish that the target committed vote-value is within an allowed range for the ballot.

11. A cryptographic voting method including:
accessing a ballot established on a blockchain,
the ballot designating multiple answers with corresponding answer identifiers;
determining a vote-value distribution to assign to the multiple answers,
the vote-value distribution distributing a voter vote-value received within a voter token;
generating a committed token for each of the multiple answers,
the committed tokens configured to bind a voter to the vote-value distribution without revealing individual committed vote-values within individual committed tokens of the committed tokens while the committed tokens are in a cryptographic form, and
at least one of the committed tokens including a null vote-value; and
requesting a transaction on the blockchain transferring the committed tokens to the multiple answers,
where transferring at least one of the committed tokens including the null vote-value obfuscates the vote-value distribution.

12. The cryptographic voting method of claim 11, where generating the committed token for each of the multiple answers includes:
applying the individual committed vote-values to an amount point on an elliptic curve to generate individual amount terms;
applying random blinding values to a blinding point on the elliptic curve to generate individual blinding terms; and
combining the individual amount terms and the individual blinding terms.

13. The cryptographic voting method of claim 12, further including selecting the blinding point by applying a hash function to the amount point.

14. The cryptographic voting method of claim 11, further including:
generating a rest token configured to transfer a remainder vote-value; and
requesting the transaction on the blockchain further includes requesting a transfer of the rest token back to the voter.

15. A cryptographic voting system, including:
network interface circuitry configured to:
obtain a ballot established on a distributed ledger,
the ballot designating answers with corresponding answer identifiers; and
receive, a voter token, the voter token conferring a voter vote-value to a voter, the voter token received responsive to a transaction on the distributed ledger addressed to a voter identifier of the voter;
cryptologic voting circuitry in communication with the network interface circuitry, the cryptologic voting circuitry configured to:
determine a target committed vote-value to assign to a target answer of the answers,
the target committed vote-value including at least a portion of the voter vote-value;
generate a target committed token,
the target committed token configured to bind the voter to the target committed vote-value without revealing the target committed vote-value while in a cryptographic form;
using a cryptographic key associated with the voter identifier,
request a first transaction on the distributed ledger transferring the target committed token to the corresponding answer identifier of the target answer;
determine a completion committed vote-value to assign to a second answer of the answers,
the completion committed vote-value including a null or another portion of the voter vote-value;
generate a completion committed token configured to bind the voter to the completion committed vote-value without revealing the completion committed vote-value while in the cryptographic form; and
using the cryptographic key associated with the voter identifier, request a second transaction on the distributed ledger transferring the completion committed token to the corresponding answer identifier of the second answer.

16. The cryptographic voting system of claim 15, where the first and second transactions includes the same transaction.

17. The cryptographic voting system of claim 15, where:
the completion committed vote-value includes a null; and
the cryptologic voting circuitry is configured to request the second transaction by obfuscating a transfer of at least the portion of the vote-value transferred to the target answer.

18. The cryptographic voting system of claim 15, where the voter identifier includes a public key of the voter; and
the cryptologic voting circuitry is configured to use the cryptographic key by digitally signing the target committed token using a private key paired with the public key.

19. The cryptographic voting system of claim 15, the cryptologic voting circuitry is further configured to deduct the target committed vote-value and the completion vote-value from the voter vote-value.

20. The cryptographic voting system of claim 19, where the cryptologic voting circuitry is configured to deduct the completion vote-value by producing a resultant null voter vote-value.

* * * * *